US012644699B2

(12) United States Patent
Takano et al.

(10) Patent No.: US 12,644,699 B2
(45) Date of Patent: Jun. 2, 2026

(54) CONTOUR LINE ANALYSIS APPARATUS, PROCESSING DIMENSION EXTRACTION SYSTEM, PROCESSING CONDITION DECISION SYSTEM, SEMICONDUCTOR DEVICE MANUFACTURING SYSTEM, AND DATA STRUCTURE

(71) Applicant: Hitachi High-Tech Corporation, Tokyo (JP)

(72) Inventors: Naoto Takano, Tokyo (JP); Hyakka Nakada, Tokyo (JP); Takeshi Ohmori, Tokyo (JP); Yutaka Okuyama, Tokyo (JP)

(73) Assignee: Hitachi High-Tech Corporation, Tokyo (JP)

(*) Notice: Subject to any disclaimer, the term of this patent is extended or adjusted under 35 U.S.C. 154(b) by 0 days.

(21) Appl. No.: 17/908,185

(22) PCT Filed: Jul. 14, 2021

(86) PCT No.: PCT/JP2021/026482
§ 371 (c)(1),
(2) Date: Aug. 30, 2022

(87) PCT Pub. No.: WO2023/286211
PCT Pub. Date: Jan. 19, 2023

(65) Prior Publication Data
US 2024/0200938 A1 Jun. 20, 2024

(51) Int. Cl.
*G01B 15/04* (2006.01)
*G06T 7/13* (2017.01)
(Continued)

(52) U.S. Cl.
CPC ................ *G01B 15/04* (2013.01); *G06T 7/13* (2017.01); *G06T 7/50* (2017.01); *G06V 10/46* (2022.01)

(58) Field of Classification Search
CPC .. G01B 15/04; G06T 7/13; G06T 7/50; G06T 2207/10061; G06T 2207/20076;
(Continued)

(56) References Cited

U.S. PATENT DOCUMENTS

2006/0187466 A1 8/2006 Li et al.
2009/0214103 A1* 8/2009 Tanaka .................... G06T 7/001
382/207
(Continued)

FOREIGN PATENT DOCUMENTS

CN 101331378 A 12/2008
JP 2009-198339 A 9/2009
(Continued)

OTHER PUBLICATIONS

Search Report mailed Oct. 5, 2021 International Application No. PCT/JP2021/026482.
(Continued)

*Primary Examiner* — Jonathan S Lee
*Assistant Examiner* — D J Dhooge
(74) *Attorney, Agent, or Firm* — Miles & Stockbridge, P.C.

(57) ABSTRACT

High-accuracy fitting for complex shapes that can occur in semiconductor processing is performed. A shape model is a curved line that is drawn with one stroke from its start point to its end point along a periphery of a figure that is a combination of one or more ellipses and one or more line segments in an xy-plane defined by an x axis and a y axis which are perpendicular to each other, and constraint conditions of a shape model are derived on the basis of a processing dimension function that represents processing dimensions specified on the basis of singular points in the
(Continued)

shape model and that has shape model parameters as its variables, and definition ranges of the processing dimensions.

15 Claims, 20 Drawing Sheets

(51) Int. Cl.
*G06T 7/50* (2017.01)
*G06V 10/46* (2022.01)

(58) Field of Classification Search
CPC ........ G06T 2207/30148; G06T 7/0006; G06V 10/46; Y02P 90/02; G05B 19/401; G05B 19/4093; G05B 19/40935; G05B 2219/2602; H01L 22/00; H01L 22/12

See application file for complete search history.

(56) References Cited

U.S. PATENT DOCUMENTS

| | | | |
|---|---|---|---|
| 2018/0165388 A1 | 6/2018 | Liu et al. | |
| 2019/0114758 A1* | 4/2019 | Vajaria ................. | C12N 15/115 |
| 2022/0042936 A1* | 2/2022 | Okai ....................... | G06N 3/045 |
| 2022/0327364 A1* | 10/2022 | Hunsche .............. | G06T 7/0006 |
| 2023/0066370 A1* | 3/2023 | Hsu ......................... | H01L 24/17 |
| 2023/0377185 A1* | 11/2023 | Nakada .................... | G06T 7/12 |

FOREIGN PATENT DOCUMENTS

| | | | |
|---|---|---|---|
| JP | 2013-073776 A | 4/2013 |
| TW | 201830277 A | 8/2018 |

OTHER PUBLICATIONS

Office Action mailed Dec. 6, 2022 in Taiwanese Application No. 111124685.
Office Action mailed Dec. 31, 2025 in Chinese Application No. 202180017356.4.

* cited by examiner

| SHAPE MODEL | PROCESSING DIMENSION TAG (4002) | PROCESSING DIMENSION NAME (4003) | PROCESSING DIMENSION FUNCTION (4004) |
|---|---|---|---|
| TRENCH 1 | SPACE WIDTH | W11 | $a + \left(\dfrac{b}{2}\right)^2 \cos^2 d + \left(\dfrac{c}{2}\right)^2 \sin^2 d$ |
| TRENCH 1 | SPACE WIDTH | W12 | $2e$ |
| TRENCH 1 | SPACE WIDTH | W13 | $2f$ |
| TRENCH 1 | DEPTH | D1 | ... |
| ... | ... | ... | ... |
| TRENCH 2 | SPACE WIDTH | W21 | ... |

(column headers: 4001 SHAPE MODEL, 4002 PROCESSING DIMENSION TAG, 4003 PROCESSING DIMENSION NAME, 4004 PROCESSING DIMENSION FUNCTION)

*FIG. 4B*

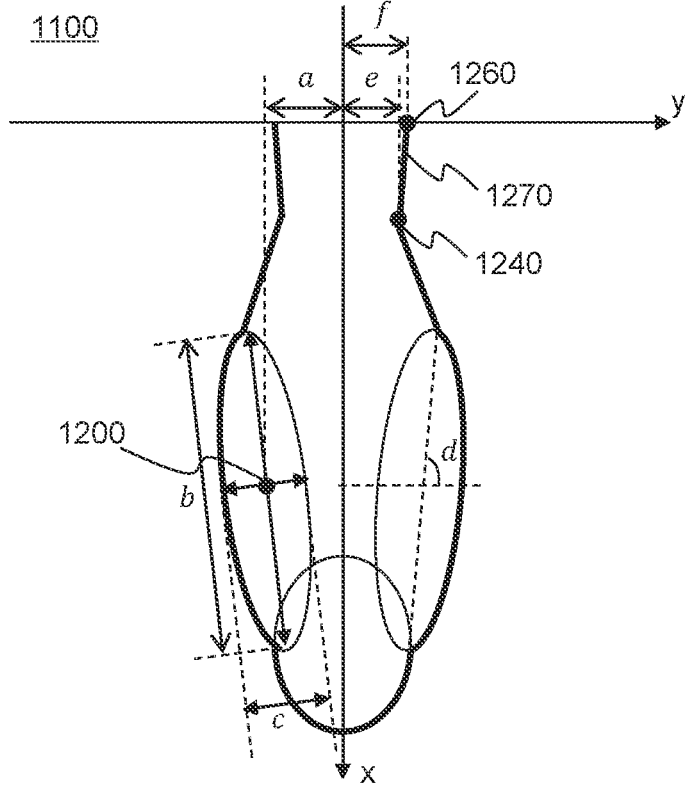

| PROCESSING DIMENSION TAG | SPACE WIDTH | | |
|---|---|---|---|
| PROCESSING DIMENSION NAME | W11 | W12 | W13 |
| PROCESSING DIMENSION FUNCTION | $a + \left(\dfrac{b}{2}\right)^2 \cos^2 d + \left(\dfrac{c}{2}\right)^2 \sin^2 d$ | $2e$ | $2f$ |
| OUTPUT ERROR | 0.06 | 0.44 | 0.42 |

Figure 18:
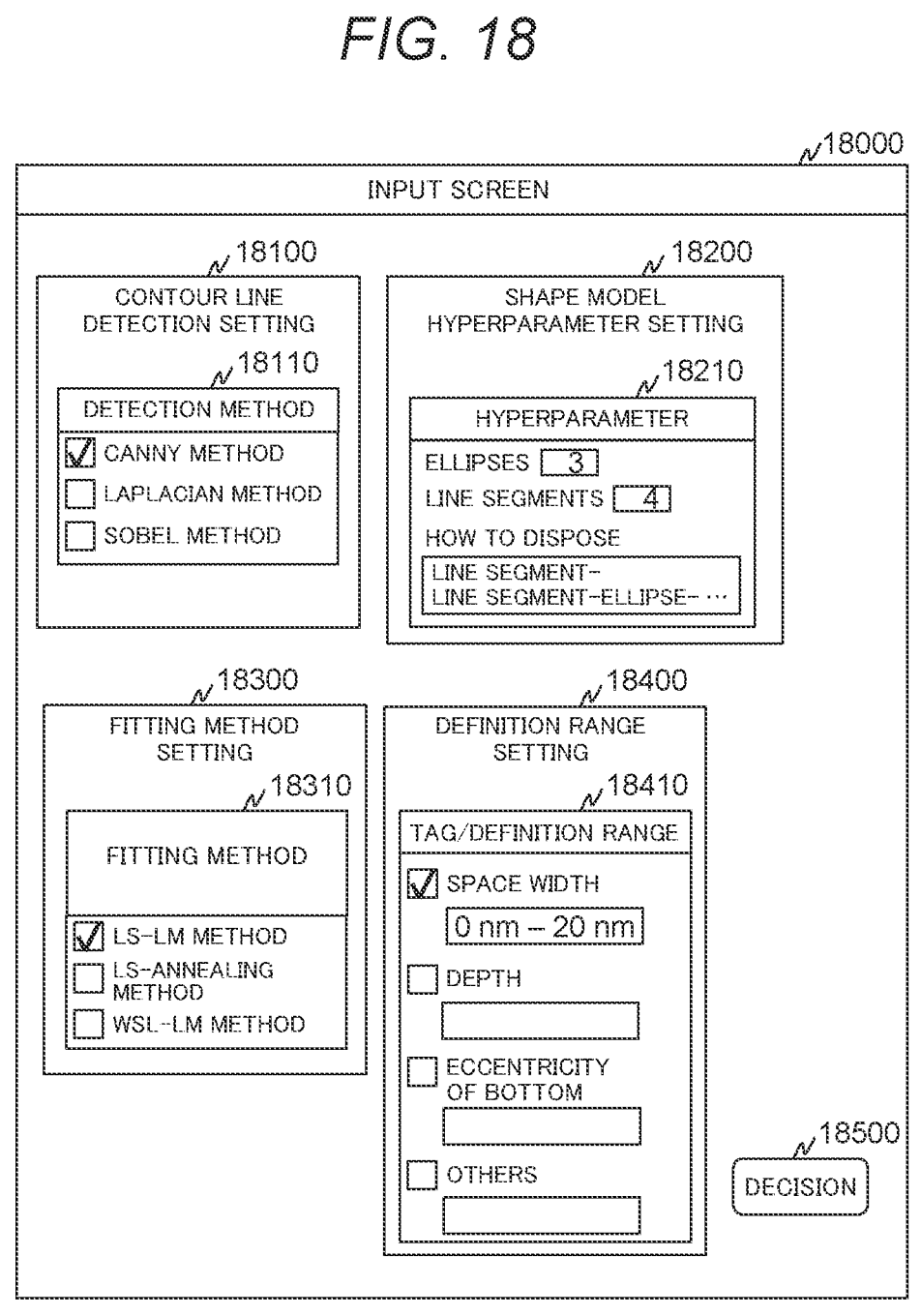

INPUT SCREEN

/18100

CONTOUR LINE
DETECTION SETTING

/18110

DETECTION METHOD

☑ CANNY METHOD

☐ LAPLACIAN METHOD

☐ SOBEL METHOD

/18200

SHAPE MODEL
HYPERPARAMETER SETTING

/18210

HYPERPARAMETER

ELLIPSES [ 3 ]

LINE SEGMENTS [ 4 ]

HOW TO DISPOSE

LINE SEGMENT–
LINE SEGMENT–ELLIPSE– ···

/18300

FITTING METHOD
SETTING

/18310

FITTING METHOD

☑ LS–LM METHOD

☐ LS–ANNEALING
METHOD

☐ WSL–LM METHOD

/18400

DEFINITION RANGE
SETTING

/18410

TAG/DEFINITION RANGE

☑ SPACE WIDTH

[ 0 nm – 20 nm ]

☐ DEPTH

☐ ECCENTRICITY
OF BOTTOM

☐ OTHERS

/18500

DECISION

CONTOUR LINE ANALYSIS APPARATUS, PROCESSING DIMENSION EXTRACTION SYSTEM, PROCESSING CONDITION DECISION SYSTEM, SEMICONDUCTOR DEVICE MANUFACTURING SYSTEM, AND DATA STRUCTURE

TECHNICAL FIELD

The present invention relates to a contour line analysis apparatus, a processing dimension extraction system, a processing condition decision system, a semiconductor device manufacturing system, and a data structure.

BACKGROUND ART

As for semiconductor processes, desirable semiconductor processing can be performed by controlling semiconductor processing apparatuses under appropriate processing conditions obtained by process development. In recent years, as new materials have been introduced for semiconductor devices, device structures have become complicated, the control ranges of semiconductor processing apparatuses have been expanded, and many control parameters have been added. The processes have become multistep processes, and fine and complicated processes have come to be executed. By using such semiconductor processing apparatuses, high-performance devices have been produced. In the following descriptions, it will be assumed that an object of process development is to derive appropriate processing conditions for a semiconductor processing apparatus that realizes the target processed shape of a semiconductor sample.

Optimization of many control parameters is indispensable to fully bring out the performance of the semiconductor processing apparatus, and to achieve this goal, know-hows in the process development, high apparatus operation skills, and a large number of trials and errors in processing tests are required. Therefore, the process development requires a large number of SEM (Scanning Electron Microscopy) dimensional measurements. For example, in the case of taking up a sample of a line and space (L/S) pattern as a processing target, if there are 10 measurement points each of which is a critical dimension (CD) or a depth for each line pattern, and the number of line patterns to be measured is 10, 100 measurements are required for each sample. If 100 samples are to be processed, 10000 dimensional measurements will be required. As the structure of a device becomes more complicated, the number of measurement points is considered to increase, so that the delay in the process development due to the lengthening of the measurement time becomes an issue. In addition, these dimensions to be measured are shrinking year by year as the structure becomes more microscopic, so that it is expected that manually extracting these dimensions will become difficult. Therefore, a technology for extracting the dimensions of a target structure from a SEM image at high speed and high-accuracy without using human intervention becomes indispensable. The following is a typical patent relating to such a technology.

In PTL 1, virtual processed shapes are created using shape models, and a database including the processed shapes and SEM signal waveforms is created using a SEM simulation. By collating an actual signal waveform obtained by SEM with the database, a processed shape the signal waveform of which is close to the actual signal waveform is specified and the processed shape is estimated as a processed shape being observed. With this, detection of the contour line of a SEM image and extraction of the dimensions of a target structure can be performed.

CITATION LIST

Patent Literature

PTL 1: Japanese Patent Application Laid-Open No. 2009-198339

SUMMARY OF INVENTION

Technical Problem

Semiconductor devices have been becoming more microscopic and three-dimensional, and various structures such as quantum computers have been being proposed. It is conceivable that manually extracting dimensions will become more difficult hereafter, so it is desirable to avoid manual operations as much as possible and automatically extract dimensions of complex and various shapes in a short time. Since, in the technology disclosed in PTL 1, the estimation of a processed shape is executed by referring to a database, it is difficult to estimate a shape that does not exist in the database. On the other hand, it is not realistic to build a huge database to recognize complicated and various shapes.

Solution to Problem

A contour line analysis apparatus that is one embodiment according to the present invention is a contour line analysis apparatus for analyzing contour line data of a target structure detected from image data of a semiconductor sample obtained by a measurement apparatus using a charged particle beam device. The contour line analysis apparatus includes: a fitting unit that fits a shape model to the contour line data and obtains shape model parameters of the shape model; a constraint condition setting unit that sets constraint conditions for the shape model parameters when the fitting unit fits the shape model to the contour line data; a shape model database for storing likely shape model parameter values of the shape model obtained by the fitting unit's fitting the shape model to the contour line data under the constraint conditions set by the constraint condition setting unit. The shape model is a curved line that is drawn with one stroke from its start point to its end point along a periphery of a figure that is a combination of one or more ellipses and one or more line segments in an xy-plane defined by an x axis and a y axis which are perpendicular to each other, and the constraint condition setting unit includes a function database that stores a processing dimension function that represents processing dimensions specified on the basis of singular points in the shape model and that has the shape model parameters as its variables, and a constraint condition derivation unit that derives the constraint conditions of the shape model parameters on the basis of definition ranges of the processing dimensions and the processing dimension function.

Advantageous Effects of Invention

High-accuracy fitting for complex shapes that can occur in semiconductor processing can be realized by using a shape model composed of a combination of one or more ellipses and one or more line segments. Other problems and new features will be explicitly shown by the descriptions of the present specification and the accompanying drawings.

BRIEF DESCRIPTION OF DRAWINGS

FIG. 4A is a data configuration example of a function database.

FIG. 4B is an example of a shape model.

FIG. 18 is an example of a setting GUI screen used in a contour line detection apparatus and a contour line analysis apparatus.

DESCRIPTION OF EMBODIMENTS

Figure 1:
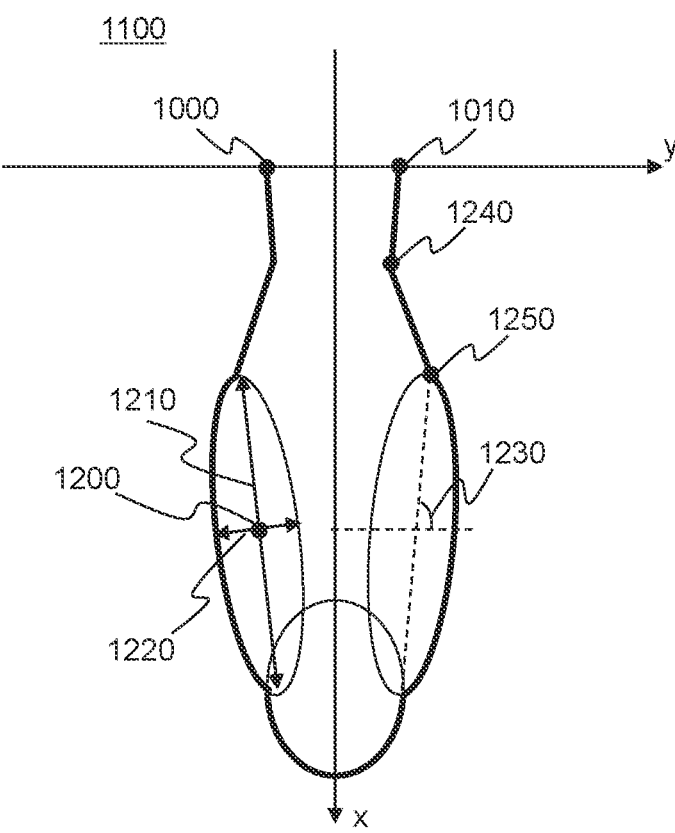
FIG. 1 is a shape model represented by using ellipses and line segments.

Hereinafter, embodiments of the present invention will be described with reference to the drawings. However, the present invention is not limited to the contents of the descriptions of the embodiments shown below. It is easily understood by those skilled in the art that a specific configuration of the present invention can be changed without departing from the idea or gist of the present invention.

There are some cases where, in order to make the present invention more easily understood, the locations, sizes, shapes, ranges, and the like of respective components depicted in the drawings and the like are different from what those really are. Therefore, the present invention is not necessarily limited to the locations, sizes, shapes, ranges, and the like of the respective components disclosed in the drawings and the like.

Etching process will be explained as an example. Generally, in etching, both isotropic etching by radicals and anisotropic etching by ion assist proceed at the same time. Portions mainly etched by the former etching tend to have curved shapes, and portions mainly etched by the latter etching tend to have linear shapes. In the present embodiments, since a shape in which straight line portions and curved line portions coexist is described, a shape model which is composed of a combination of ellipses and line segments is adopted. By fitting this shape model to the contour line of a target structure, the model parameters of this shape model are estimated. In the following descriptions, these model parameters are referred to as shape model parameters. By substituting likely shape model parameter values obtained by fitting into the shape model, a shape model that accurately describes the contour line of the target structure can be obtained. Various dimensions of the contour line can be extracted from this shape model.

Furthermore, speeding-up of the dimension extraction contributes to speeding-up of process development using machine learning. In the process development using the machine learning, a correlation model $Y=f(X)$ such as a regression having processing conditions as explanation variables X and feature quantities regarding a processed shape (shape feature quantities) as object variables Y is obtained from experiment data, and processing conditions that give target shape feature quantities are estimated from the correlation model.

Figure 2A:
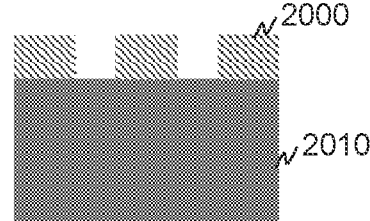
FIG. 2A is a pattern sample with a mask.
Figure 2B:
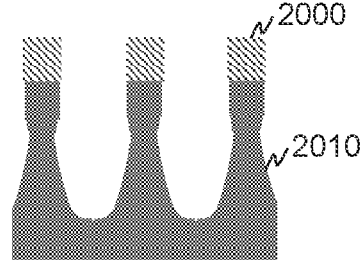
FIG. 2B is a diagram showing the sample shown in FIG. 2A after etching processing is performed on the sample.
Figure 2C:
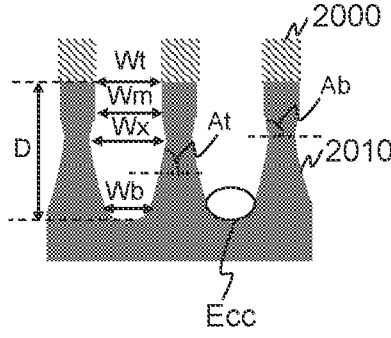
FIG. 2C is a diagram showing examples of shape feature quantities.

FIG. 2A is a pattern sample with a mask that is a typical example of a semiconductor sample, and FIG. 2B is a diagram showing the sample shown in FIG. 2A after etching processing is performed on the sample. Since a film 2010 to be etched is preferentially etched over a mask 2000, a trench structure (target structure) corresponding to the planar shape of the mask 2000 is formed. Typical examples of shape feature quantities used for describing the shape of the trench structure in FIG. 2B are shown in FIG. 2C. Since an obtained processed shape is complex, various types of shape feature quantities such as a maximum width Wx, a depth D, the width Wb of a bottom, the width Wt of an upper portion, the width Wm of a middle portion, a taper angle At, a bowing angle Ab, the eccentricity Ecc of the bottom can be considered.

EXAMPLE 1

Figure 3:
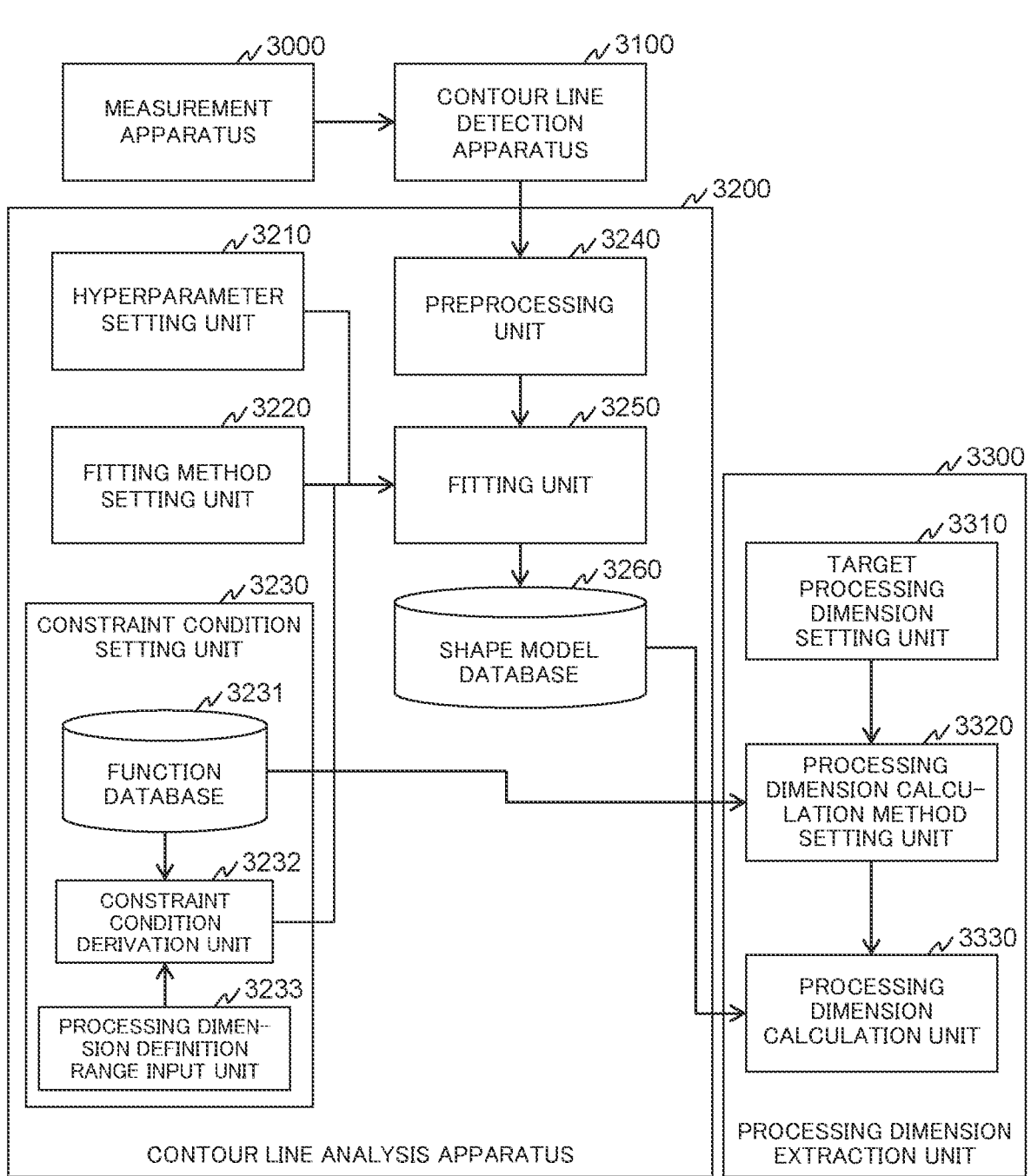
FIG. 3 is a configuration example of a processing dimension extraction system according to Example 1.

FIG. 1 and FIG. 3 are respectively a diagram showing a shape model and a diagram showing a configuration example of a processing dimension extraction system according to Example 1. The dimension extraction system according to Example 1 extracts processing dimensions desired by a user from an image obtained by a measurement apparatus such as a SEM image using a shape model. Processing dimensions to be extracted are, for example, the shape feature quantities illustrated in FIG. 2C.

As shown in FIG. 1, a start point 1000 and an end point 1010 are provided on the periphery of a figure that is a combination of ellipses and line segments drawn on the xy-plane formed by the x-axis and the y-axis that are perpendicular to each other, and a curved line obtained by connecting the start point 1000 and the end point 1010 with a single stroke is set to be a shape model 1100. Although FIG. 1 shows a line-symmetrical shape model composed of a combination of three ellipses and four line segments, a shape model may be composed of one or more ellipses and one or more line segments and may be a dissymmetric model with respect to a line.

Model parameters that describe a shape model is referred to as shape model parameters. The shape model parameters includes: first parameters related to the shapes and dispositions of ellipses such as the coordinates of the center point 1200, the major axis length 1210, the minor axis length 1220, the gradient 1230 of the major axis of an ellipse and the shapes and dispositions of line segments such as the coordinates of the end points of a line segment (1240, 1250); and second parameters related to how to draw a curved line with one stroke (whether to connect the inner periphery or the outer periphery of an ellipse, and the like) as illustrated in FIG. 1. The first parameters shown in FIG. 1 are exemplary parameters, and the first parameters are not limited to the exemplary parameters if the figure can be unambiguously defined. For example, a line segment can be defined by parameters such as the coordinates of the start point of the line segment, the direction of the line segment, and the length of the line segment. By adjusting these shape model parameters, various shapes can be described.

Next, the processing dimension extraction system according to this example will be explained with reference to FIG. 3.

A measurement apparatus 3000 is a measurement apparatus such as a SEM, and obtains information about a target structure of a sample as image data. In the following explanations, it will be assumed that a scanning electron microscope (SEM) is used as the measurement apparatus 3000, but the measurement apparatus 3000 is not limited to the SEM, and any measurement apparatus that obtains information about a sample using phenomena such as reflection, transmission, and interference that occurs when electrons or the like are incident on the sample can be used as the measurement apparatus 3000. To put it concretely, a transmission electron microscope and a scanning transmission electron microscope may be used. Image data obtained by the measurement apparatus 3000 may be image data obtained by any of such electron microscopes.

A contour line detection apparatus 3100 is an apparatus that detects the contour line of a target structure from a SEM image, and outputs the contour line data of the SEM image in response to the SEM image inputted from the measurement apparatus 3000. As a contour line detection method, there is a method that detects a contour line on the basis of the changes of pixel values such as the Sobel method, the Canny method, or the Laplacian method, or a method that uses machine learning such as OpenCV.

A contour line analysis apparatus 3200 is an apparatus that fits a shape model to a contour line data detected by the contour line detection apparatus 3100, and extracts likely shape model parameter values. The contour line analysis apparatus 3200 includes: a hyperparameter setting unit 3210; a fitting method setting unit 3220; a constraint condition setting unit 3230; a preprocessing unit 3240; a fitting unit 3250; and a shape model database 3260.

The hyperparameter setting unit 3210 sets shape model hyperparameters. The shape model hyperparameters are parameters that define the structure of a figure for describing a shape model. To put it concretely, the shape model hyperparameters prescribe: the respective numbers of ellipses and line segments comprising the figure, and the order of dispositions of the ellipses and the line segments.

Here, the order of dispositions of the ellipses and the line segments is the order of dispositions of the ellipses and the line segments when the figure that describes the shape model is traced from the start point 1000 to the end point 1010. In the order of dispositions of components, an ellipse and a line segment are not separated. In the case of the shape model 1100 shown in FIG. 1, the shape model hyperparameters of the shape model 1100 shows that the number of ellipses is 3, the number of line segments is 4, and in the order of dispositions of the line segments and the ellipses, a line segment, a line segment, an ellipse, an ellipse, an ellipse, a line segment, and a line segment are disposed in this order from the start point 1000.

The fitting method setting unit 3220 sets a method for fitting a shape model to contour line data.

The constraint condition setting unit 3230 sets constraint conditions for shape model parameters in fitting, and includes a function database 3231, a constraint condition derivation unit 3232, and a processing dimension definition range input unit 3233.

Figure 5:
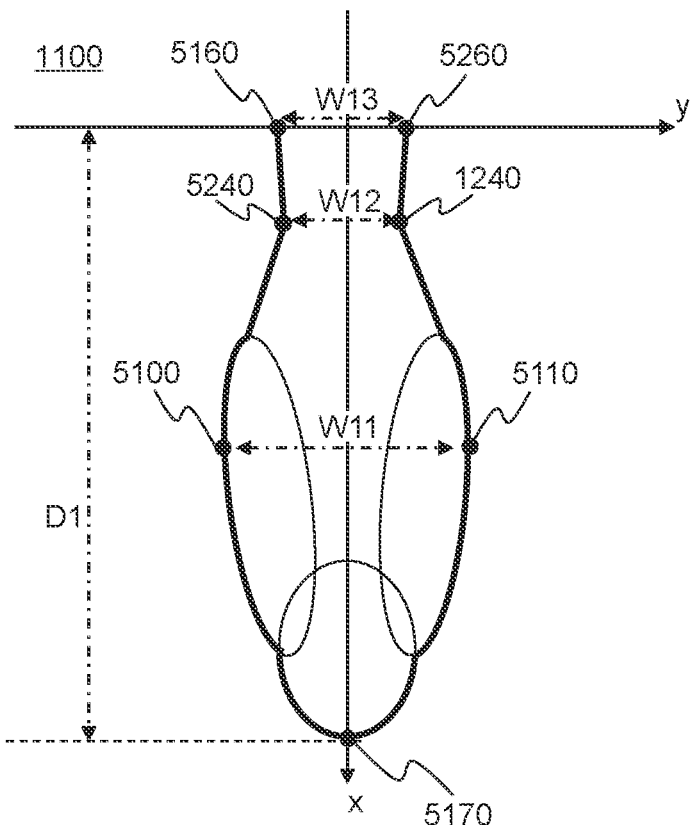
FIG. 5 is an example of a shape model.

A data configuration example of the function database 3231 is shown in FIG. 4A. One pair of a processing dimension tag and a processing dimension function associated with the processing dimension tag or more pairs for each shape model are stored in the function database 3231. A processing dimension tag 4002 is a tag that prescribes a type of a processing dimension (shape feature quantity) such as "space width", "depth", or "taper angle", for example. A processing dimension name 4003 is a name that specifies a processing dimension in a shape model 4001. A processing dimension function 4004 is a function that has a shape model parameter as a variable, and returns an estimated value of the value of a processing dimension specified by the processing dimension name 4003 as an output value. For example, variables a to d included in a processing dimension function of a processing dimension name W11 are shape model parameters. FIG. 4B shows the shape model of a shape model "TRENCH 1". The shape model "TRENCH 1" is the shape model 1100 shown in FIG. 1. As shown in FIG. 4B, in the shape model 1100, the y-coordinate of the center point 1200 of an ellipse that forms the side wall of the shape model is a, the lengths of the major axis and the minor axis of the ellipse are b and c respectively, and the gradient of the major axis of the ellipse is d. The processing dimension name W11 is a Euclidean distance between two extremum points 5100 and 5110 in left and right ellipses that form the side walls of the shape model 1100 respectively as shown in FIG. 5, and the value of the Euclidean distance can be estimated using the relevant processing dimension function. Although details are omitted, the processing dimension function of the processing dimension name W11 can be derived analytically by differentiating the function of the shape model with respect to x and finding the coordinates of the extremum points at which the gradients become 0.

Processing dimensions at plural positions can be associated with one processing dimension tag. In the example shown in FIG. 4A, the shape model "TRENCH 1" stores a processing dimension name W12 and a processing dimension name W13 as well as the processing dimension name W11 regarding a processing dimension tag "space width". Variables e and f in processing dimension functions of the processing dimension names W12 and W13 are also shape model parameters. As shown in FIG. 4B, the y-coordinate of the lower end point 1240 of a line segment 1270 is e, and the y-coordinate of the upper end point 1260 of the line segment 1270 is f. As shown in FIG. 5, the processing dimension name W12 is a Euclidean distance between the end points 5240 and 1240 of a left line segment and a right line segment at the higher portion of the side walls of the shape model, and the processing dimension name W13 is a Euclidean distance between the end points 5160 and 5260 of a left line segment and a right line segment at the opening portion of the shape model, and those values can be estimated using the relevant processing dimension function.

In such a way, various processing dimensions in the shape model 1100 can be described using shape model parameters. Here, the name of a processing dimension tag can be edited by a user, and if there is a processing dimension that is difficult to name, the processing dimension may be named "other" or the like.

A user inputs the definition ranges of the values of processing dimensions prescribed by processing dimension tags stored in the function database 3231 using the processing dimension definition range input unit 3233.

The constraint condition derivation unit 3232 outputs constraint conditions for shape model parameters so that the values of processing dimensions do not exceed the definition ranges inputted in the processing dimension definition range input unit 3233.

The preprocessing unit 3240 performs preprocessing on the contour line data detected by the contour line detection apparatus 3100, and inputs contour line data on which the preprocessing has been performed into the fitting unit 3250. Here, if the preprocessing is not required, the contour line data detected by the contour line detection apparatus 3100 is inputted into the fitting unit 3250 as it is.

The fitting unit 3250 fits the shape model to the inputted contour line data under the constraint conditions derived by the constraint condition derivation unit 3232. The values of shape model parameters obtained by fitting are referred to as likely shape model parameter values. A shape model into which the likely shape model parameter values are substituted is referred to as a likely shape model. Combinations of the shape model hyperparameters and the likely shape model parameter values are stored in the shape model database 3260.

A processing dimension extraction apparatus 3300 includes: a target processing dimension setting unit 3310; a processing dimension calculation method setting unit 3320; and a processing dimension calculation unit 3330.

A user sets desired processing dimensions (shape feature quantities) that the user wants to extract using the target processing dimension setting unit 3310. In the case where the processing dimension extraction system according to the present example is applied to process development, target processing dimensions in the process development are set as desired processing dimensions.

In the processing dimension calculation method setting unit 3320, a method for calculating the target processing dimensions is set.

The processing dimension calculation unit 3330 calculates the target processing dimensions using the method set in the processing dimension calculation method setting unit 3320.

Figure 6:
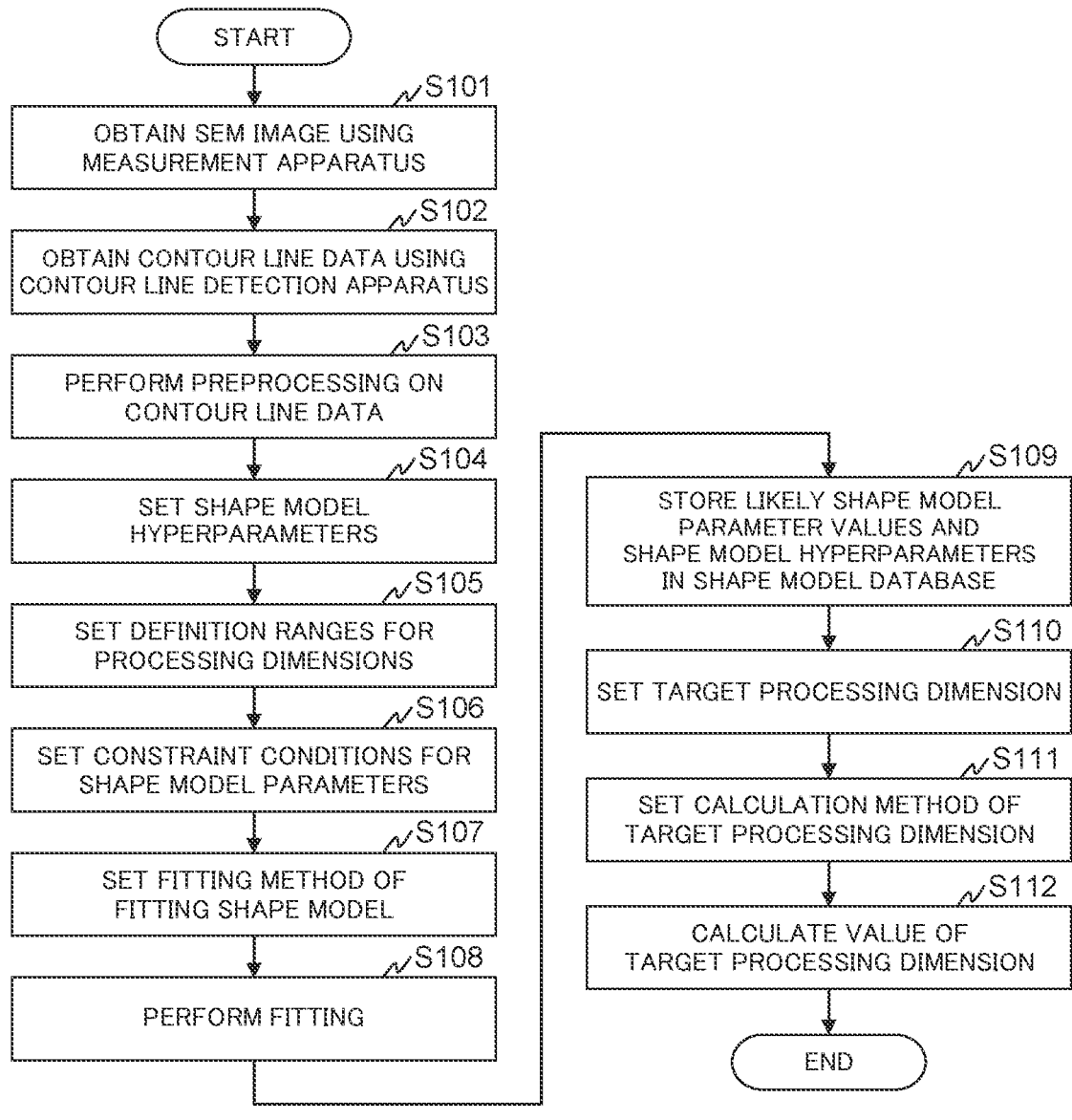
FIG. 6 is a processing dimension extraction flowchart according to Example 1.

A flowchart for extracting dimensions using the processing dimension extraction system shown in FIG. 3 is shown in FIG. 6. In the following, a method for extracting dimensions will be explained with reference to FIG. 6.

First, a SEM image is obtained using the measurement apparatus 3000 (S101).

Next, contour line data is obtained from the SEM image using the contour line detection apparatus 3100 (S102).

Figure 7A:
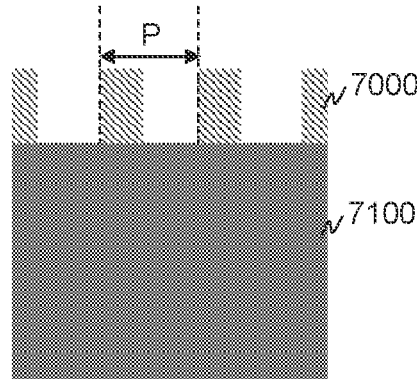
FIG. 7A is an example of a pattern sample with a mask.
Figure 7B:
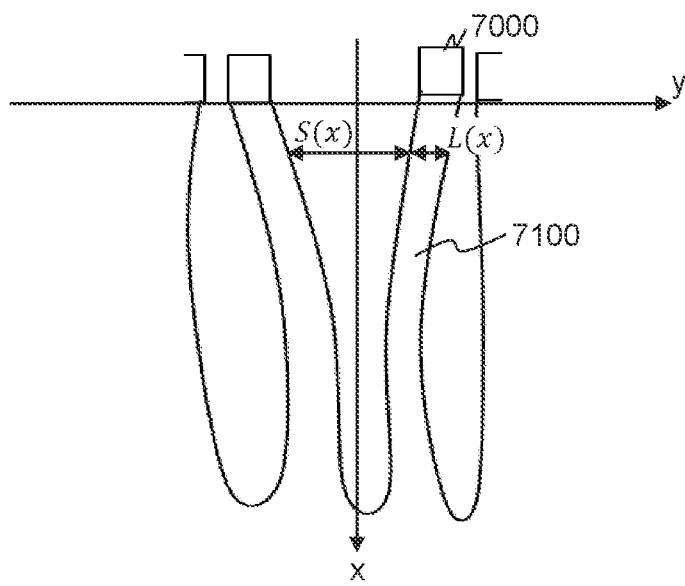
FIG. 7B is an example of contour line data before preprocessing.
Figure 7C:
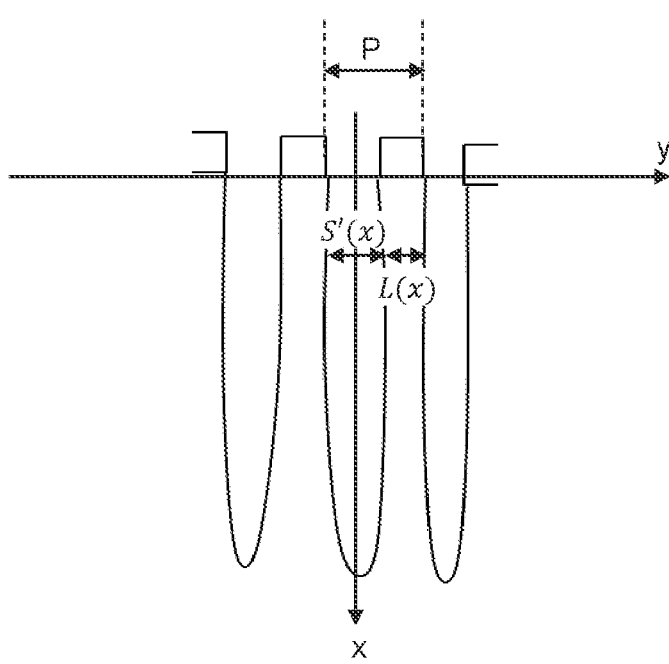
FIG. 7C is an example of the contour line data after the preprocessing.

Successively, the preprocessing unit 3240 performs preprocessing on the contour line data (S103). An example of the preprocessing will be explained with reference to FIGS. 7A to 7C. FIG. 7A is a sample with a typical L/S pattern on which processing has not been performed, and a mask 7000 is formed on a film 7100 to be etched. Here, let P be a pitch of the mask 7000 on which the processing has not been performed. An example of the contour line of a cross-sectional shape obtained by performing the processing on this sample is shown in FIG. 7B. In the processing of a fine pattern with a width on the order of 10 nm, the side walls of the pattern are excessively etched and the pattern become thin, so that the line portions of the pattern may collapse and the pattern may be distorted. In the preprocessing unit 3240, the contour line with such a distorted pattern is normalized. To put it concretely, the following method can be used for the normalization.

Here, let a space width and a line width of a pattern at a coordinate x in the pattern (FIG. 7B) on which preprocessing has not been performed be S(x) and L(x) respectively. When the pattern is distorted in such a way, it is the space width S(x) that greatly fluctuates, and the line width L(x) hardly fluctuates. Therefore, a true space width S' (x), which will be obtained before the distortion occurs, can be estimated on the basis of the pitch P and the line width L(x). So, the preprocessing unit 3240 creates the contour line of an L/S pattern that has the line width L(x) and the space width S' (x) and that is symmetric with respect to the x axis as a pattern after the preprocessing. Here, the space width S' (x) is set to be P-L(x).

Next, the hyperparameter setting unit 3210 sets shape model hyperparameters (S104). For example, a user can directly input the shape model hyperparameters, or can decide the shape model hyperparameters using a method to be described later in Example 2.

Next, the constraint condition setting unit 3230 sets constraint conditions for the shape model parameters (S105, S106). In the following, the processing of the sample (pitch P=20 nm) shown in FIG. 7A will be described as an example. The shape model "TRENCH 1" composed of three ellipses and four line segments shown in FIG. 5 is considered to be used as a shape model. For the shape model "TRENCH 1", processing dimension tags and processing dimension functions shown in FIG. 4A are stored in the function database 3231.

First at step S105, the user sets definition ranges for the processing dimensions of the processing dimension tags stored in the function database 3231 in the processing dimension definition range input unit 3233. Here, the definition ranges for the processing dimension tags "SPACE WIDTH" are set to be 0 nm or larger and 20 nm or smaller. This is because the pitch P of the shape before the processing is 20 nm, so that the space widths after the processing cannot exceed 20 nm. At step S106, the constraint condition derivation unit 3232 derives conditions that make the output values of the processing dimension functions of the processing dimension tags "SPACE WIDTH" fall within the definition ranges respectively. In the present example, the definition ranges "0 nm or larger and 20 nm or smaller" are imposed on the processing dimension tags "SPACE WIDTH", so (Expression 1) is derived as constraint conditions that make all the output values of the processing dimension functions that correspond to the processing dimension names W11, W12, W13 associated with the processing dimension tags "SPACE WIDTH" fall within the definition ranges respectively.

$$\begin{cases} 0 \leqq a + \left(\dfrac{b}{2}\right)^2 \cos^2 d + \left(\dfrac{c}{2}\right)^2 \sin^2 d \leqq 20 \\ \qquad\qquad 0 \leqq 2e \leqq 20 \\ \qquad\qquad 0 \leqq 2f \leqq 20 \end{cases} \qquad \text{[Expression 1]}$$

Processing dimension functions stored in the function database 3231 will be explained below. Assuming that the depth direction of the target structure is the x-axis direction, indifferentiable points in the differentiation of the shape model with respect to x, extremum points where the differential coefficients of the shape model with respect to x are 0, and the coordinates of inflection points where the second order differential coefficients of the shape model with respect to x change from positive to negative or vice versa are set to be singular points. As illustrated, singular points are points the coordinates of which can be analytically derived by executing a calculation such as derivation on a shape model, and the coordinates of the singular points can be represented using shape model parameters. Processing dimensions are specified on the basis of singular points on a shape model. For example, processing dimensions are specified by a Euclidean distance between two singular points different from each other, a difference between the x-coordinates of two singular points different from each other or a difference between the y-coordinates of two singular points different from each other, a gradient of a line segment connected to two singular points different from each other, the curvature of an ellipse that is located at a singular point and that makes up the shape model, and the like, and a processing dimension function that describes the relevant processing dimensions is defined. For example, in the shape model 1100 shown in FIG. 5, a point 5160 and a point 5170 are a point where the shape model is interrupted and a point a gradient at which becomes infinite respectively, so that they are both indifferentiable points. A mathematical expression that expresses a difference between the x-coordinates of these two singular points can be defined as a processing dimension function of a depth D1.

Next, the fitting method setting unit 3220 sets a method used when a shape model is fitted to the contour line data (S107). For example, shape model parameters can be estimated by using a nonlinear optimization method, that is, an iterative solution method such as a Lagrange undetermined multiplier method, a sequential quadratic programming method, a barrier function method, or a penalty function method, or by using a combinatorial optimization method, wherein a least-square method, a weighted least-square method, or a regularized least-square method is adopted. In addition, the fitting method setting unit 3220 also executes settings related to a fitting end condition and generation methods for random numbers and initial values used at the time of optimization processing.

On the basis of the settings made in the above-mentioned steps S104 to S107, fitting is executed on the shape model using the contour line data output from the preprocessing unit 3240 (S108). And then, combinations of likely shape model parameter values obtained at step S108 and the shape model hyperparameters are stored in the shape model database 3260 (S109).

Next, in the target processing dimension setting unit 3310, a type of a processing dimension (target processing dimension) that the user wants to extract is set (S110). As for the types of target processing dimensions, there are, for example, the shape feature quantities shown in FIG. 2C (S110). Successively, a calculation method of the target processing dimension is set using the processing dimension calculation method setting unit 3320 (S111). For example, there is a method in which one processing dimension function that accurately describes the target processing dimension (hereinafter, referred to as a likely processing dimension function) is selected among processing dimension functions stored in the function database 3231, and the output value of the selected processing dimension function is calculated as the value of the target processing dimension. The likely processing dimension function may be specified by the user, or may be specified using a method later described in Example 3.

The target processing dimension set at step S110 is calculated using the calculation method set at step S111 (S112) and the flow is finished.

EXAMPLE 2

Figure 8A:
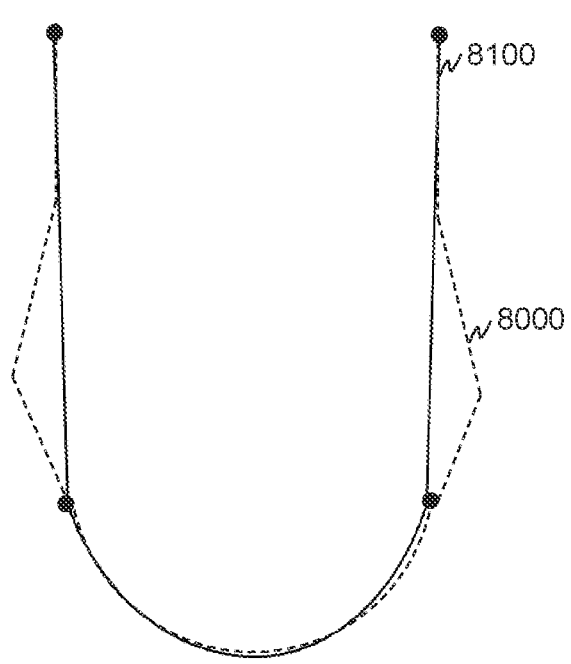
FIG. 8A is a diagram showing a fitting result using a simple shape model.
Figure 8B:
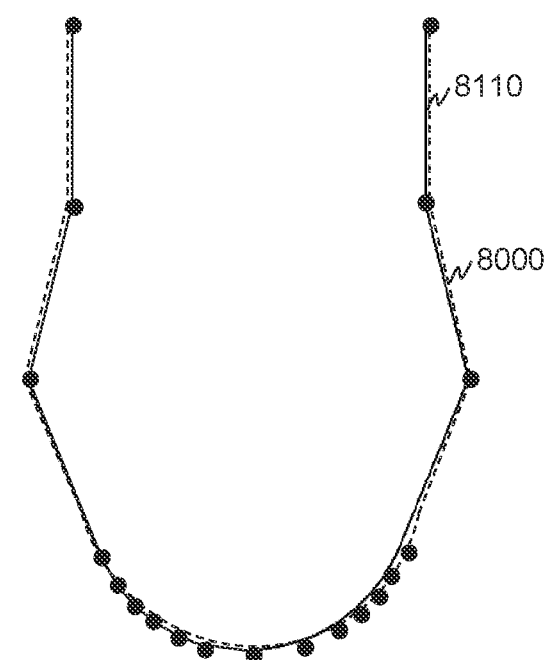
FIG. 8B is a diagram showing a fitting result using a complex shape model.

A contour line analysis apparatus according to Example 2 includes a function to support the appropriate setting of shape model hyperparameters. Here, appropriate shape model hyperparameters will be explained. FIG. 8A shows the result of fitting a shape model 8100 composed of one ellipse and two line segments to a contour line data 8000. Each of black points shown in FIG. 8A shows a point where the ellipse and a line segment are connected to each other. In this case, since the shape model 8100 is too simple, the shape model 8100 cannot describe the contour line data 8000 sufficiently, and a fitting error becomes large. On the other hand, FIG. 8B shows the result of fitting a shape model 8110 composed of one ellipse and 17 line segments to the same contour line data 8000. By using a large number of line segments, the expressive power of the shape model is improved, and the fitting is completed successfully with almost no error.

While the fitting accuracy can be improved by making a shape model complicated, if the shape model is made too complicated, the number of shape model parameters becomes enormous. Since the increase in the number of shape model parameters directly leads to the difficulty of learning a machine learning model, a large amount of experimental data is required for learning. Therefore, the number of processes by a semiconductor processing apparatus increases, and there is a concern that the relevant process development period will be prolonged. Considering the above, it is desirable to set shape model hyperparameters that can balance the two requirements of not impairing the fitting accuracy and not increasing the number of shape model parameters too much.

Figure 9:
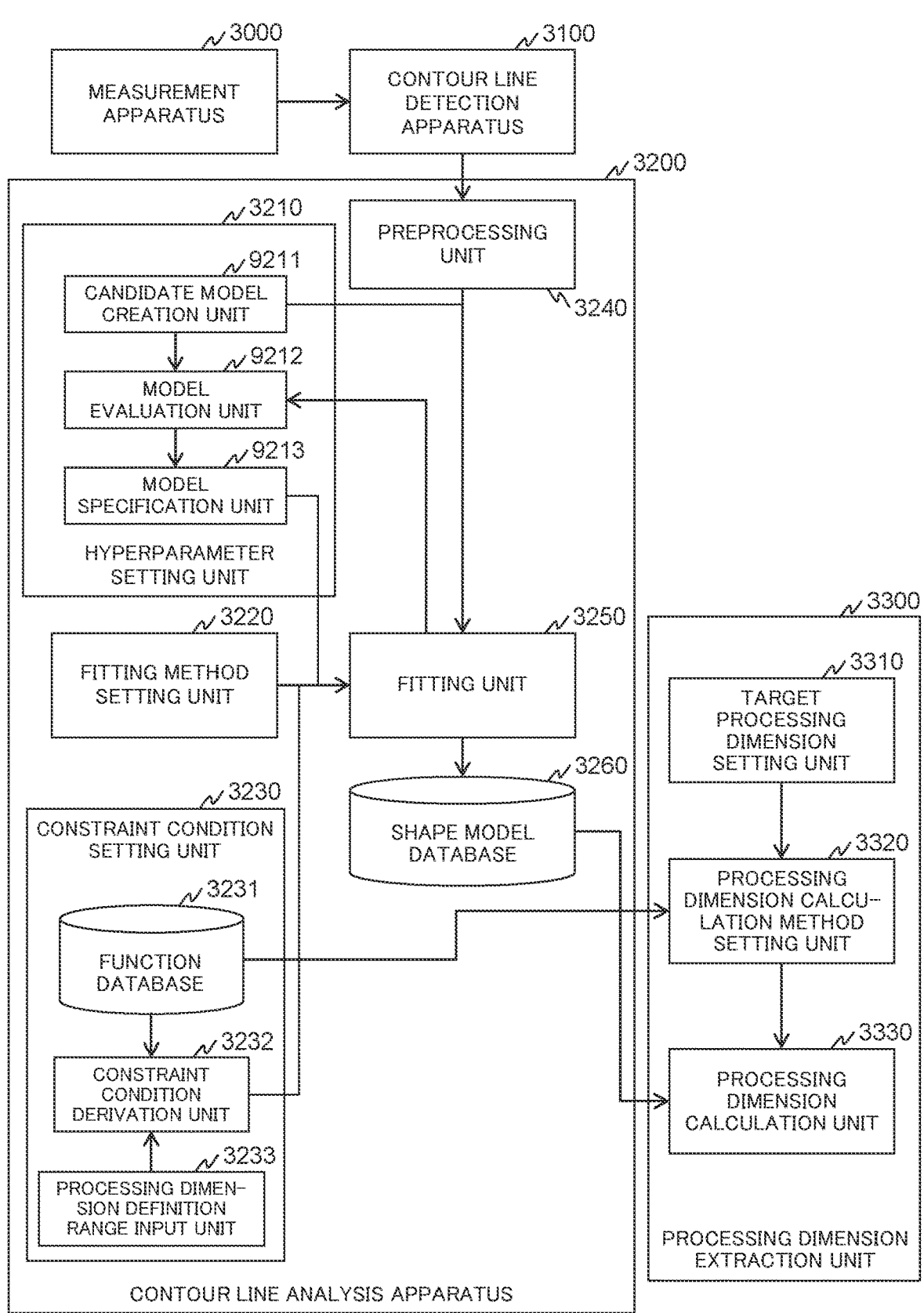
FIG. 9 is a configuration example of a processing dimension extraction system according to Example 2.

FIG. 9 is a diagram showing a configuration example of a processing dimension extraction system according to Example 2. The same components as those in the processing dimension extraction system according to Example 1 shown in FIG. 3 are given the same reference signs and redundant explanations about the same components will be omitted. A hyperparameter setting unit 3210 includes: a candidate model creation unit 9211; a model evaluation unit 9212; and a model specification unit 9213.

The candidate model creation unit 9211 creates plural shape models based on different shape model hyperparameters, for example, shape models having the different numbers of ellipses and line segments, shape models having the different disposition orders of ellipses and line segments, and the like as candidate models.

The model evaluation unit 9212 evaluates the result of fitting the plural candidate models created by the candidate model creation unit 9211 using a fitting unit 3250. To put it concretely, assuming the shape model hyperparameters of a candidate model are expressed by a, the value of a loss function $L(\alpha)=E(\alpha)+R(\alpha)$ that is given by the sum of a fitting error $E(\alpha)$ obtained when fitting this candidate model and a regularization term $R(\alpha)$ regarding the number of the shape model parameters of this candidate model is calculated. As the regularization term $R(\alpha)$ regarding the number of the shape model parameters, for example, the number of the shape model parameters itself or a constant multiple thereof is used.

The value of the loss function $L(\alpha)$ becomes large if the fitting error is large or the number of the shape model parameters. Therefore, it can be said that a shape model the value of the loss function $L(\alpha)$ of which is low is a desirable shape model. So, in the model specifying unit 9213, a shape model the value of the loss function $L(\alpha)$ of which is the lowest is specified among the candidate models. Hereinafter, this specified shape model is referred to as the best shape model.

Figure 10:
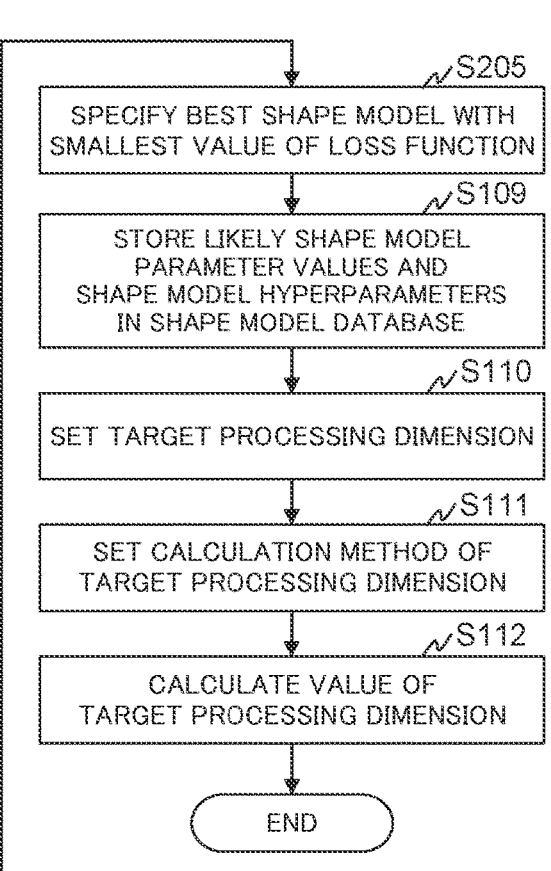
FIG. 10 is a processing dimension extraction flowchart according to Example 2.

FIG. 10 shows a flowchart for extracting dimensions by the processing dimension extraction system shown in FIG. 9. Hereinafter, a dimension extraction method will be described with reference to FIG. 10. Furthermore, the same steps as in FIG. 6 are given the same reference numerals, and redundant explanations about the same steps will be omitted.

Figure 11:
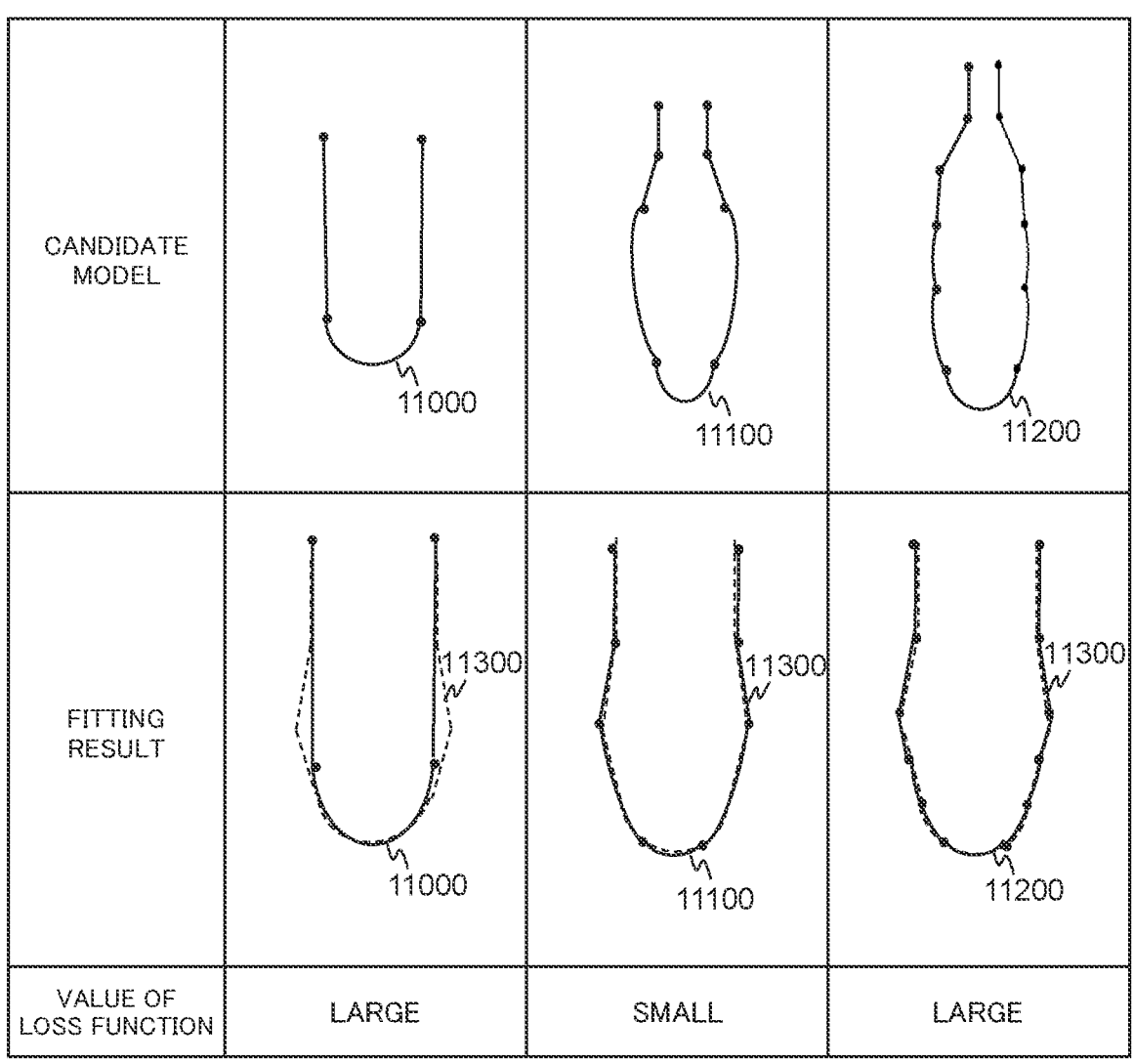
FIG. 11 is a diagram showing an example of a fitting result and an example of a value of a loss function for each candidate model.

The candidate model creation unit 9211 creates plural candidate models (S201). In the following, the flow will be described assuming that three candidate models 11000, 11100, and 11200 shown in FIG. 11 are created. The candidate model 11000 is composed of one ellipse and two line segments, the candidate model 11100 is composed of three ellipses and four line segments, and the candidate model 11200 is composed of five ellipses and six line segments.

Next, one of the candidate models created by the candidate model creation unit 9211 is selected (S202). The setting of the definition ranges of processing dimensions (S105), the setting of the constraint conditions for shape model parameters (S106), and the setting of a fitting method (S107) are executed on the selected candidate model, and the fitting unit 3250 executes fitting on the candidate model on the basis of the above settings using contour line data outputted from the preprocessing unit 3240 (S108). The details of each processing content are as described in Example 1.

Next, the model evaluation unit 9212 calculates the value of the loss function of the relevant candidate model (S203). Subsequently, it is judged whether the values of the loss functions of all the candidate models created by the candidate model creation unit 9211 have been calculated or not (S204). If there is a candidate model the value of the loss function of which has not been calculated yet, the flow gets back to step S202. If the values of the loss functions of all the candidate models have been calculated, the flow proceeds to step S205.

A candidate model the value of the loss function of which is the smallest is specified as the best shape model by the model specification unit 9213 (S205). FIG. 11 shows the fitting result of each candidate model to contour line data 11300 and the value of the loss function of each candidate model. Although the shape model of the candidate model 11000 is simple, and the number of the shape model parameters of the candidate model 11000 is small, the complicated shape of the contour line data 11300 cannot be described accurately, so that the fitting error is large, and the value of the loss function becomes large. Although the expressive power of the shape model of the candidate model 11200 is high and the contour line data 11300 can be described accurately, the number of the shape model parameters is large, so that the value of the loss function becomes large. The number of the shape model parameters of the candidate model 11100 is smaller than that of the candidate model 11200, and the fitting error of the candidate model 11100 is smaller than that of the candidate model 11000, so that the value of the loss function of the candidate model 11100 becomes the smallest. In this case, the candidate model 11100 is specified as the best shape model.

Subsequently, likely shape model parameter values obtained by fitting the best shape model and the shape model hyperparameters of the best shape model are stored in a shape model database 3260 (S109), and the setting of target processing dimensions (S110), the setting of a calculation method of the target processing dimensions (S111), and the calculation of the values of the target processing dimensions (S112) are executed. The details of each processing content are as described in Example 1.

EXAMPLE 3

In Example 1, as an example of a calculation method for target processing dimensions, a method in which a likely processing dimension function is specified from the function database 3231 and the target processing dimensions are calculated using this function is described. However, processing dimension functions are generally expressed in complex mathematical expressions, so that there are some cases where it is difficult for a user to understand the processing dimension of which portion each processing dimension function in the function database 3231 describes. In such cases, it is difficult for the user himself/herself to specify the likely processing dimension function. Therefore, in the present example, a system including a function to support the specification of a likely processing dimension function will be explained.

Figure 12:
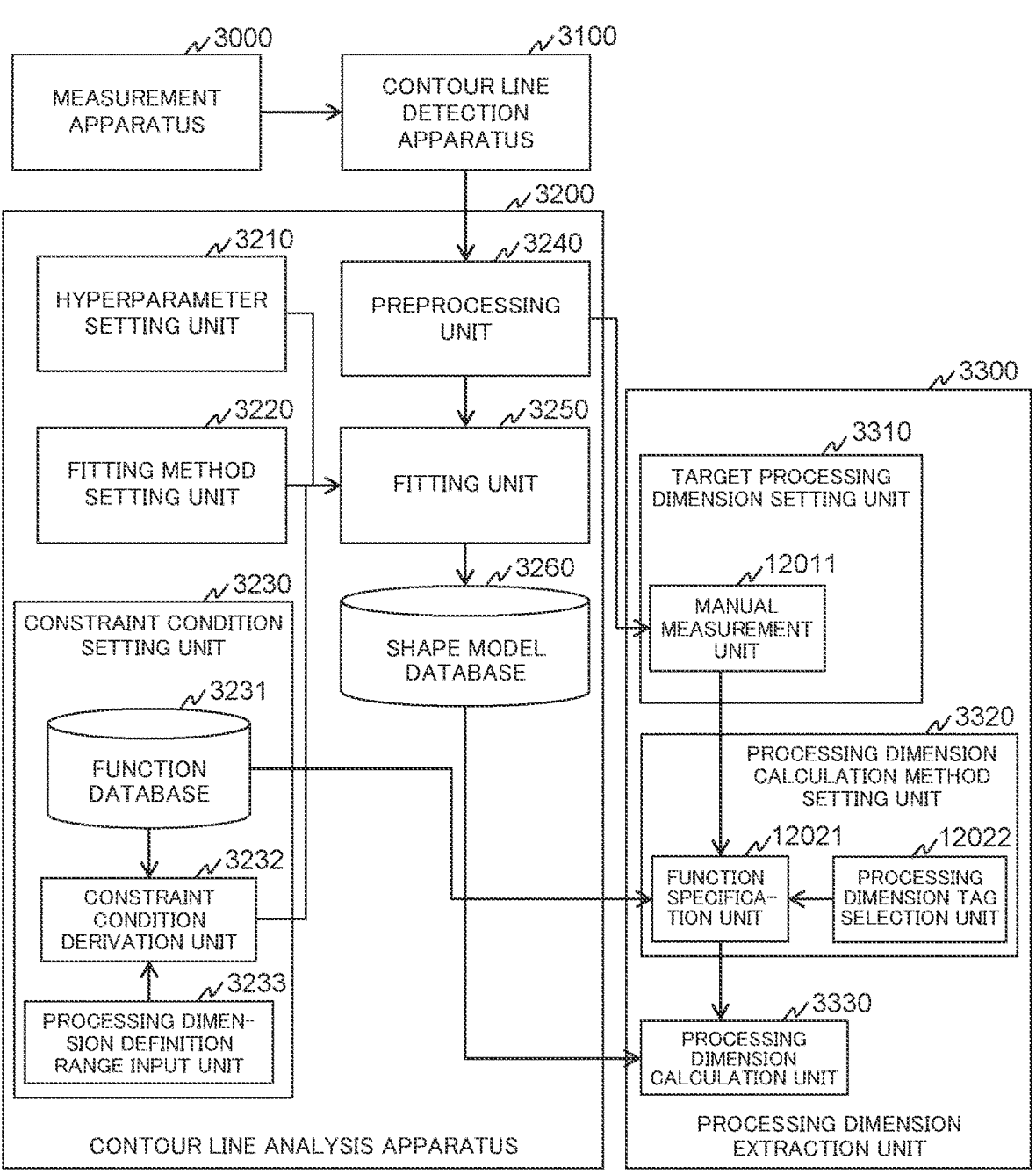
FIG. 12 is a configuration example of a processing dimension extraction system according to Example 3.

FIG. 12 is a diagram showing a configuration example of a processing dimension extraction system according to Example 3. The same components as those in the processing dimension extraction system according to Example 1 shown in FIG. 3 are given the same reference signs and redundant explanations about the same components will be omitted. In a processing dimension extraction apparatus 3300, a target processing dimension setting unit 3310 includes a manual measurement unit 12011. In the manual measurement unit 12011, the user measures desired processing dimensions for at least one contour line data outputted from a preprocessing unit 3240. The user performs this measurement manually by visually specifying measurement positions.

A processing dimension calculation method setting unit 3320 includes a processing dimension tag selection unit 12022 and a function specification unit 12021 used for specifying a likely processing dimension function from the function database 3231. In the processing dimension tag selection unit 12022, the user selects at least one processing dimension tag from processing dimension tags stored in the function database 3231. In the function specification unit 12021, a likely processing dimension function is searched for and specified among processing dimension functions associated with the processing dimension tag selected in the processing dimension tag selection unit 12022. As a concrete method, there is a method in which errors between output values obtained by inputting likely shape model parameter values stored in the shape model database 3260 into respective processing dimension functions and the measurement value of the target processing dimension measured in the manual measurement unit 12011 are calculated. Hereinafter, these errors will be referred to as output errors. A processing dimension function associated with the smallest output error is specified as the likely processing dimension function. In addition, in the case where measurement is performed on plural contour line data in the manual measurement unit 12011, for example, a processing dimension function associated with the smallest average output error may be specified as the likely processing dimension function.

In a processing dimension calculation unit 3330, a target processing dimension for a contour line data, for which the target processing dimension has not been measured in the manual measurement unit 12011, is calculated using the likely processing dimension function specified by the function specification unit 12021.

Figure 13:
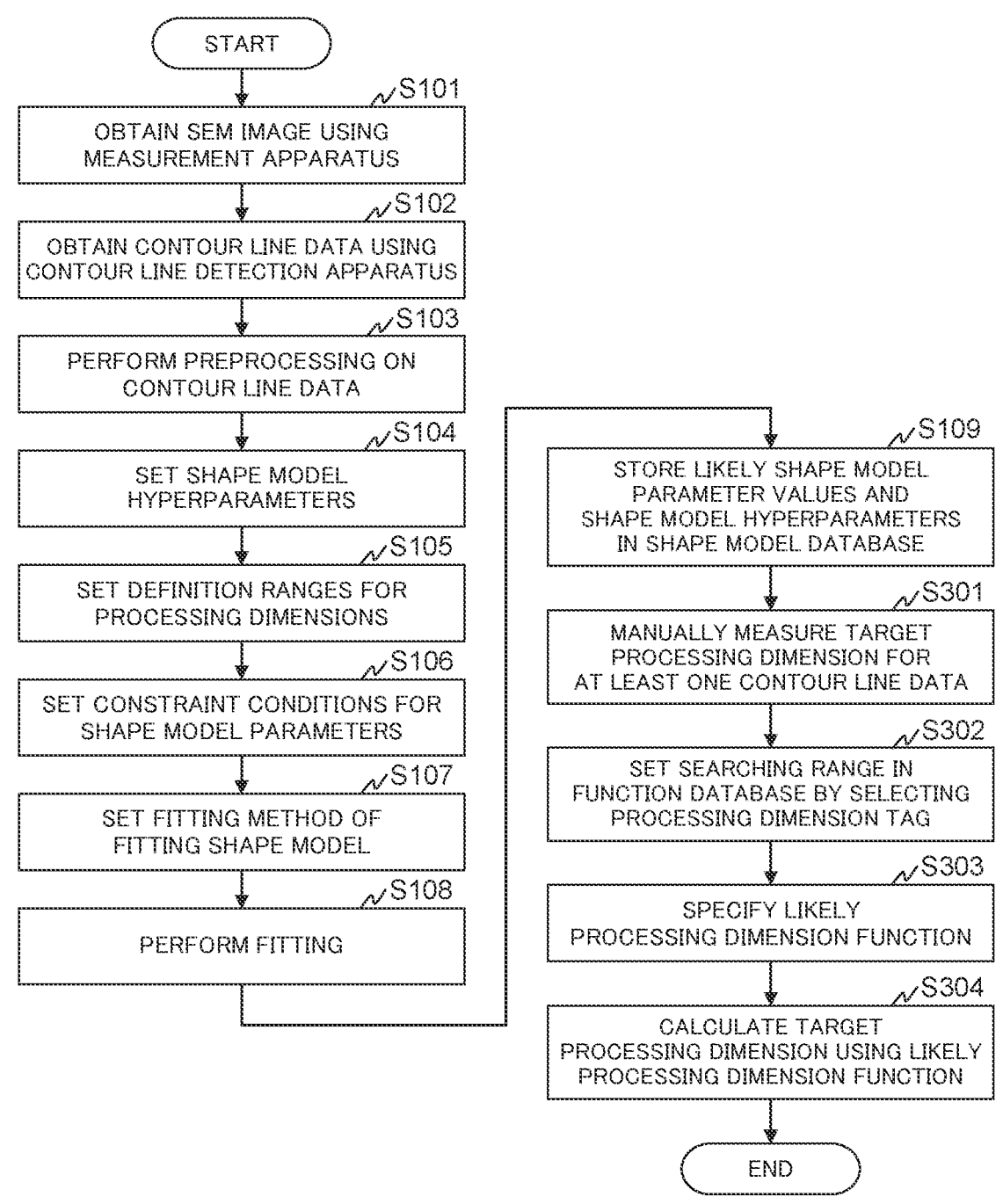
FIG. 13 is a processing dimension extraction flowchart according to Example 3.

FIG. 13 shows a flowchart in which dimensions are extracted by the processing dimension extraction system shown in FIG. 12. Hereinafter, a dimension extraction method will be described with reference to FIG. 13. Furthermore, the same steps as in FIG. 6 are given the same reference numerals, and redundant explanations about the same steps will be omitted.

In the manual measurement unit 12011, a target processing dimension that the user wants to extract is manually measured for at least one contour line data (S301). For example, assuming that a target processing dimension is the space width 14100 of the bowing portion of a contour line data 14000 shown in FIG. 14, the user manually measures this dimension.

Next, in the processing dimension tag selection unit 12022, the user selects at least one processing dimension tag from the processing dimension tags stored in the function database 3231 (S302). For example, the processing dimension tag "SPACE WIDTH" is selected from the function database 3231 shown in FIG. 4A. Therefore, the processing dimension functions of the processing dimension names "W11", "W12", and "W13" associated with the processing dimension tag "SPACE WIDTH" are set to be the searching range for the likely processing dimension function.

Figures 14, 15:
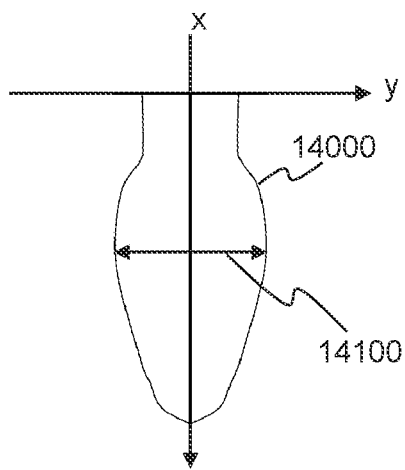
FIG. 14 is a diagram used for explaining a manual measurement performed in a manual measurement unit.
FIG. 15 is an example of an output error for each processing dimension function.

The function specification unit 12021 calculates output errors for the processing dimension functions associated with the processing dimension tag selected by the user, and a processing dimension function having the lowest output error is specified as the likely processing dimension function (S303). In the present example, since "SPACE WIDTH" is selected at step S302, output errors for the processing dimension names W11, W12, and W13 associated with the processing dimension tag "SPACE WIDTH" are calculated. FIG. 15 shows examples of the output errors. In this case, an output error for a processing dimension function with the processing name W11 is the smallest. Therefore, it can be judged that the processing dimension function with the processing dimension name W11 most accurately describes the space width 14100 measured manually at step S301. As a result, the function specification unit 12021 specifies the processing dimension function with the processing dimension name W11 that has the lowest output error as the likely processing dimension function.

Lastly, the processing dimension calculation unit 3330 calculates a target processing dimension for contour line data, on which measurement has not been performed in the manual measurement unit 12011, using the likely processing dimension function (S304).

EXAMPLE 4

Conventionally, in process development using machine learning, there is no quantitative guideline as to what should be used as the shape feature quantities of a semiconductor sample, and it is left to a user's judgment. Therefore, there is a concern that important feature quantities for describing a processed shape will be missing, or that redundant feature quantities will be adopted as objective variables.

In the former case, since the expressive power of a correlation model becomes weak, it becomes difficult to estimate processing conditions for realizing a target processed shape, so that there is a concern that the relevant process development period will be prolonged. In the latter case, as the number of the variables increases, the learning difficulty of a correlation model increases, and a lot of experimental data are required for machine learning, so that the number of processes executed by a semiconductor processing apparatus increases, which leads to a concern that the relevant process development period will be prolonged.

In Example 4, shape model parameters are used as shape feature quantities for describing the processed shape of a target structure. As a result, it becomes possible to avoid the missing of important feature quantities and the adopting of redundant feature quantities, which leads to the speeding up of the relevant process development.

Figure 16:
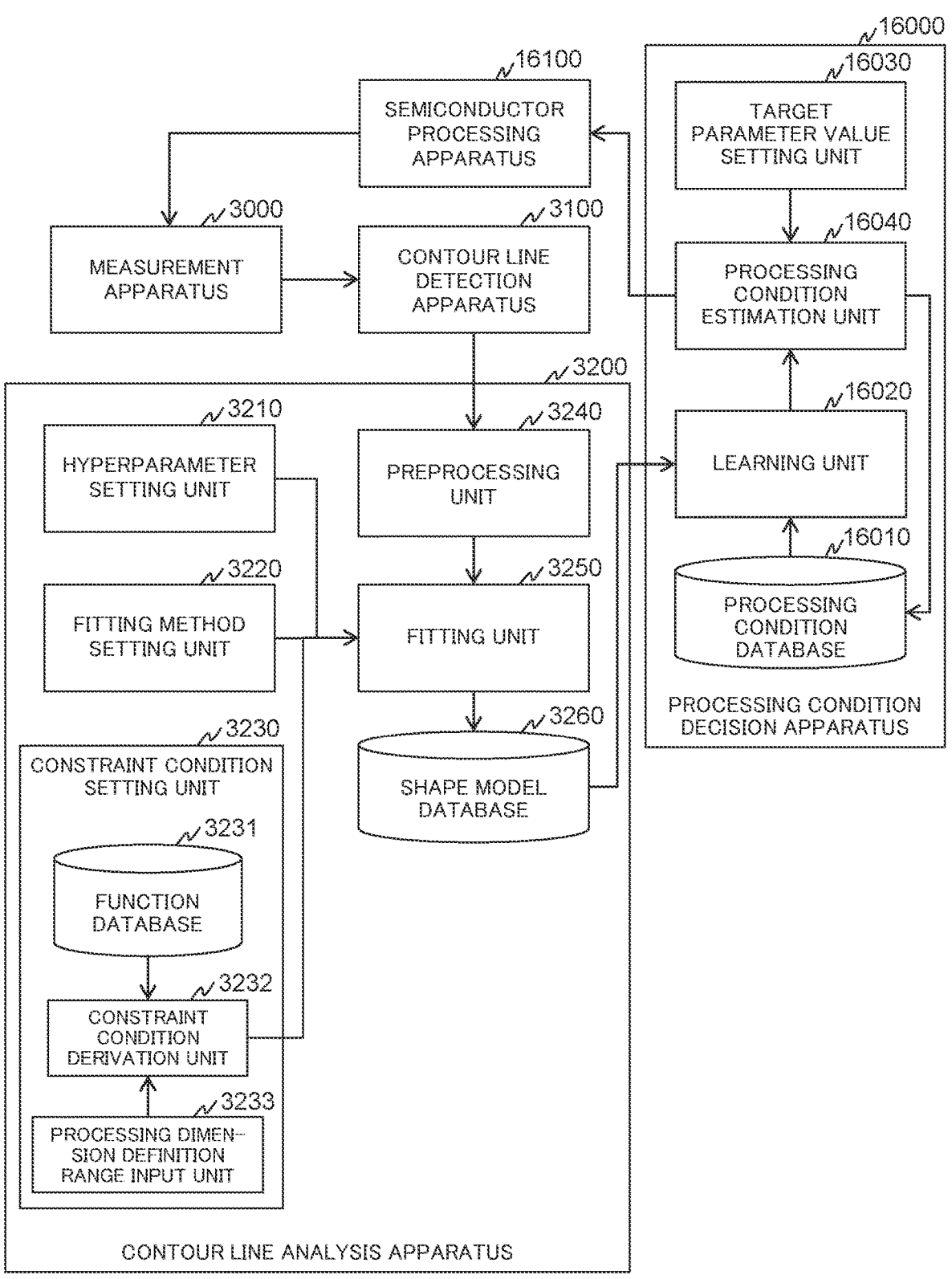
FIG. 16 is a configuration example of a processing condition extraction system according to Example 4.

FIG. 16 is a configuration example of a processing condition decision system according to Example 4. The same components as those in the processing dimension extraction system according to Example 1 shown in FIG. 3 are given the same reference signs and redundant explanations about the same components will be omitted. A processing condition decision apparatus 16000 includes a processing condition database 16010, a learning unit 16020; a target parameter value setting unit 16030, and a processing condition estimation unit 16040, and decides appropriate processing conditions for a semiconductor processing apparatus 16100 on the basis of likely shape model parameter values stored in a shape model database 3260 and processing conditions stored in the processing condition database 16010.

The processing condition database 16010 is a database in which existing processing conditions and processing conditions estimated by the processing condition estimation unit 16040 are stored. In the learning unit 16020, a correlation model between the likely shape model parameter values in the shape model database 3260 and the processing conditions in the processing condition database 16010 is learned. In the target parameter value setting unit 16030, a shape model parameter value desired by the user (target value) is set. In the processing condition estimation unit 16040, a processing condition that gives a shape model parameter value set in the target parameter value setting unit 16030 is estimated using the correlation model obtained in the learning unit 16020.

The semiconductor processing apparatus 16100 is an apparatus for processing a semiconductor sample, and performs processing on the sample using the processing conditions decided by the processing condition decision apparatus 16000. The semiconductor processing apparatus 16100 includes semiconductor manufacturing apparatuses such as lithography device, a film forming device, a pattern processing device, an ion injection device, a heating device, and cleaning device. As the lithography device, there is a photolithography device, an electron beam lithography device, an X-ray lithography device, or the like. As the film forming device, there is a CVD, a PVD, a vapor deposition device, a spattering device, or a thermal oxidation device. As the pattern processing device, there is a wet etching device, a dry etching device, an electron beam processing device, a laser processing device, or the like. As the ion injection device, there is a plasma doping device, ion beam doping device, or the like. As the heating device, there is a resistance heating device, a lamp heating device, a laser heating device, or the like.

Figure 17:
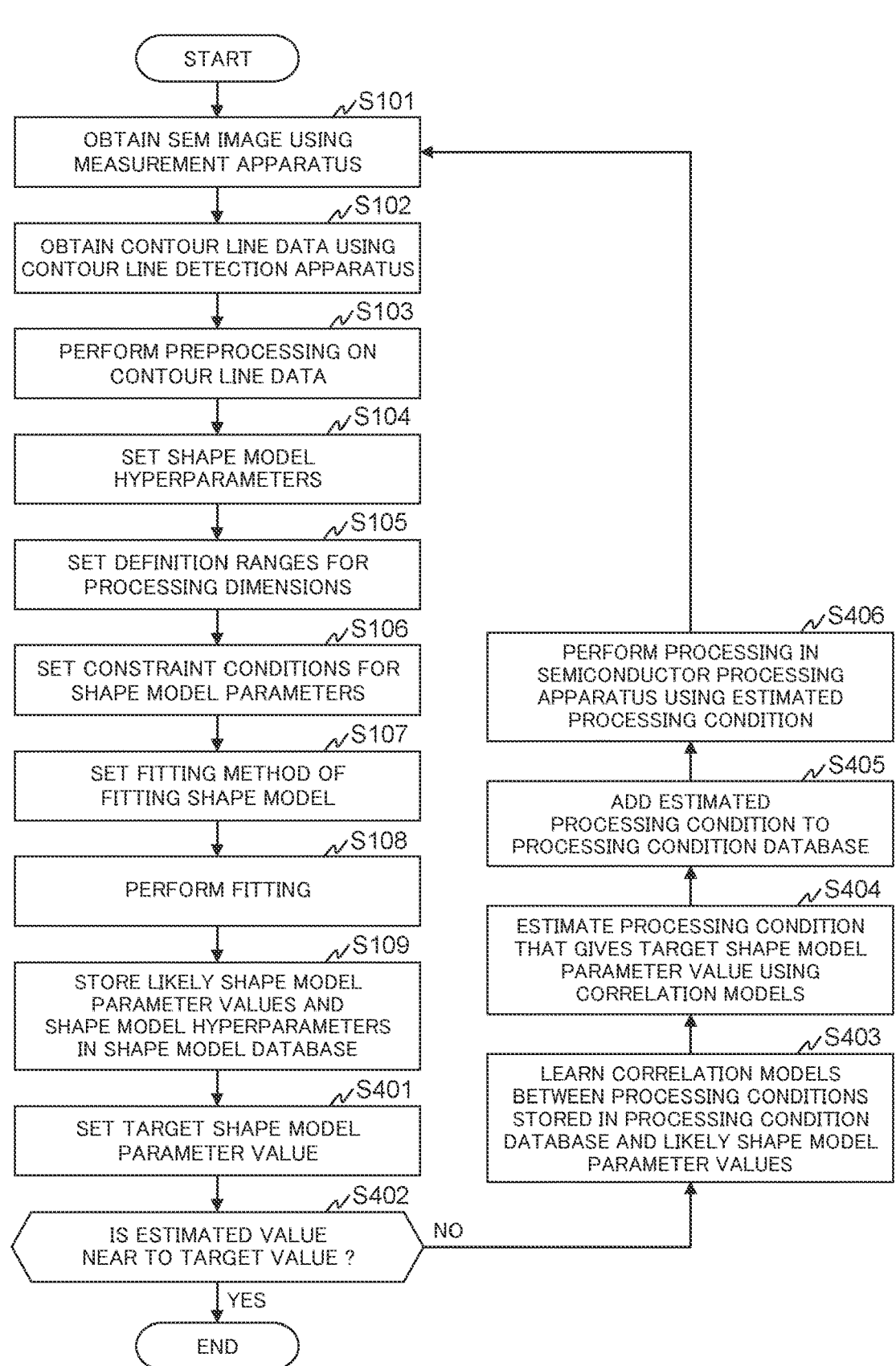
FIG. 17 is a processing condition decision flowchart according to Example 4.

FIG. 17 shows a flowchart for deciding the processing conditions of a semiconductor processing apparatus using the processing condition decision system shown in FIG. 16. Hereinafter, the decision method of the processing conditions will be explained with reference to FIG. 17. Furthermore, the same steps as in FIG. 6 are given the same reference numerals, and redundant explanations about the same steps will be omitted.

After a likely shape model parameter value is stored in the shape model database 3260 (S109), the user sets a target shape model parameter value, which the user wants to realize as the processing result of the semiconductor sample, using the target parameter value setting unit 16030 (S401).

Next, it is judged whether or not the likely shape model parameter value estimated at step S108 is near to the shape model parameter value set in the target parameter value setting unit 16030 (target value) (S402). Here, a distance for evaluating the closeness of the estimated value is calculated using any of the Euclidean distance, the Manhattan distance, the Chebyshev distance, and the Mahalanobis distance. Whether or not this calculated value is close is determined on the basis of whether or not the calculated value is smaller or larger than a criterion value set by the user. At step S402, if it is judged that the likely shape model parameter value estimated at step S108 is close to the shape model parameter value set in the target parameter value setting unit 16030 (target value), the flow is ended.

On the other hand, when it is judged that they are not close to each other, correlation models between the processing conditions stored in the processing condition database 16010 and the likely shape model parameter values stored in the shape model database 3260 are learned in the learning unit 16020 (S403). Here, the correlation models represent regression models or classification models, and models using kernel methods, models using neural networks, or models using decision trees are used as the correlation models.

Next, the processing condition estimation unit 16040 estimates a processing condition that gives the shape model parameter value (target value) set in the target parameter value setting unit 16030 using the correlation models obtained in the learning unit 16020 (S404). The estimated processing condition is added to the processing condition database 16010, so the database is updated (S405). In the semiconductor processing apparatus 16100, the processing is performed on a new sample using the estimated processing condition (S406). The processed sample is taken up from the semiconductor processing apparatus 16100, and the flow proceeds to the procedure of step S101. The above-described series of procedures are repeated until the end.

A GUI used in the above-described Examples 1 to 4 is shown in FIG. 18. A GUI screen 18000 shown in FIG. 18 is an input screen used for inputting the settings in the contour line detection apparatus 3100 and the contour line analysis apparatus 3200. It will be assumed that the GUI screen 18000 is displayed after step S101 in each example.

The GUI screen 18000 includes a contour line detection setting box 18100, a shape model hyperparameter setting box 18200, a fitting method setting box 18300, a definition range setting box 18400, and a decision button 18500.

The contour line detection setting box 18100 is provided with a detection method input unit 18110. For example, in the detection method input unit 18110, as a contour line detection method, a method that detects a contour line on the basis of the changes of pixel values such as the Sobel method, the Canny method, or the Laplacian method, or a method that uses machine learning such as OpenCVcan be selected.

The shape model hyperparameter setting box 18200 is provided with a hyperparameter input unit 18210. Shape model hyperparameters can be inputted from the hyperparameter input unit 18210, and the numbers of ellipses and line segments that compose a shape model and how to dispose the ellipses and the line segments can be input.

The fitting method setting box 18300 is provided with a fitting method input unit 18310. For example, a method for optimizing a shape model parameter by the Levenberg-Marquardt method using the least squared method, a method for optimizing a shape model parameter by the annealing method using the least squared method, a method for optimizing a shape model parameter by the Levenberg-Marquardt method using the weighted least squared method, or the like can be selected. Here, in FIG. 18, these methods are abbreviated as LS-LM METHOD, LS-ANNEALING METHOD, and WSL-LM METHOD respectively.

The definition range setting box 18400 is provided with a definition input unit 18410. The definition ranges of processing dimensions can be inputted into the definition input unit 18410, and on the basis of definition ranges inputted into the definition range input unit 18410, the constraint condition derivation unit 3232 derives constraint conditions for shape model parameters.

After the above input operation is finished, the procedure at step S102 is started by a user's pushing the decision button 18500.

Figure 19:
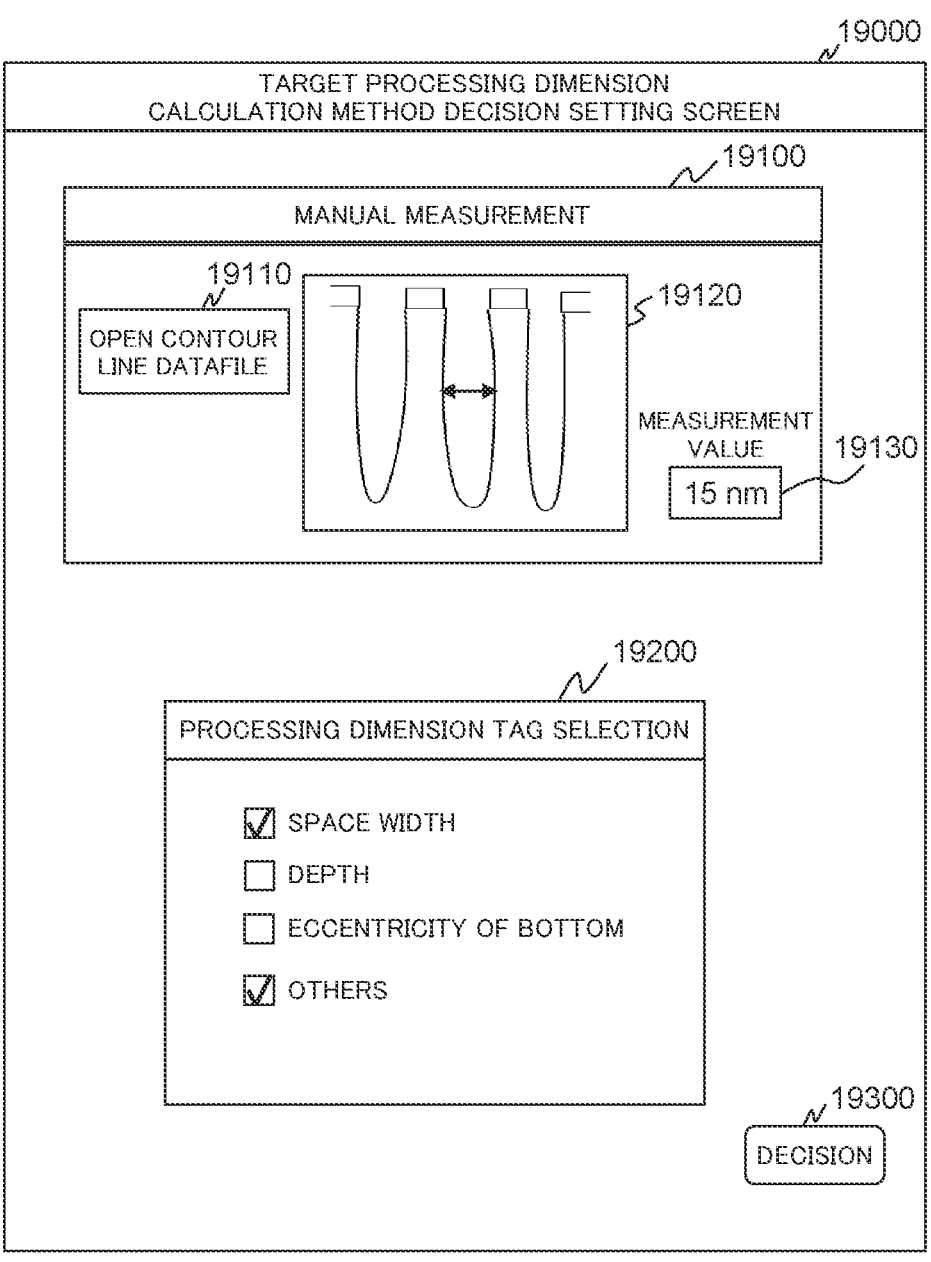
FIG. 19 is an example of a GUI screen for target processing dimension calculation method setting.

A GUI for setting a calculation method for calculating a target processing dimension in Example 3 is shown in FIG. 19. It will be assumed that a GUI screen 19000 is displayed before step S301 (refer to FIG. 13), and the GUI screen 19000 includes a manual measurement box 19100, a processing dimension tag selection box 19200, and a decision button 19300.

The manual measurement box 19100 is provided with a contour line datafile Open button 19110, a manual measurement screen 19120, and a manual measurement result display box 19130. By pushing the contour line datafile Open button 19110, contour line data the user wants to manually measure can be selected from contour line data output from the preprocessing unit 3240. Selected contour line data is displayed on the manual measurement screen 19120, and the user can visually measure the target processing dimension by dragging and dropping. A measurement result is displayed on the manual measurement result display box 19130.

A list of processing dimension tags stored in the function database 3231 are displayed on the processing dimension tag selection box 19200, and the user selects at least one processing dimension tag.

After performing a manual measurement using the manual measurement box 19100 and processing dimension tag selection using the processing dimension tag selection box 19200, if the decision button 19300 is pushed, the flow proceeds to step S301.

Here, combinations of some of the functions described in Example 1 to Example 4 can be used, and for example, a function to support the appropriate setting of dimension shape model hyperparameters explained in Example 2 can be applied to the processing condition decision system explained in Example 4.

Figure 20:
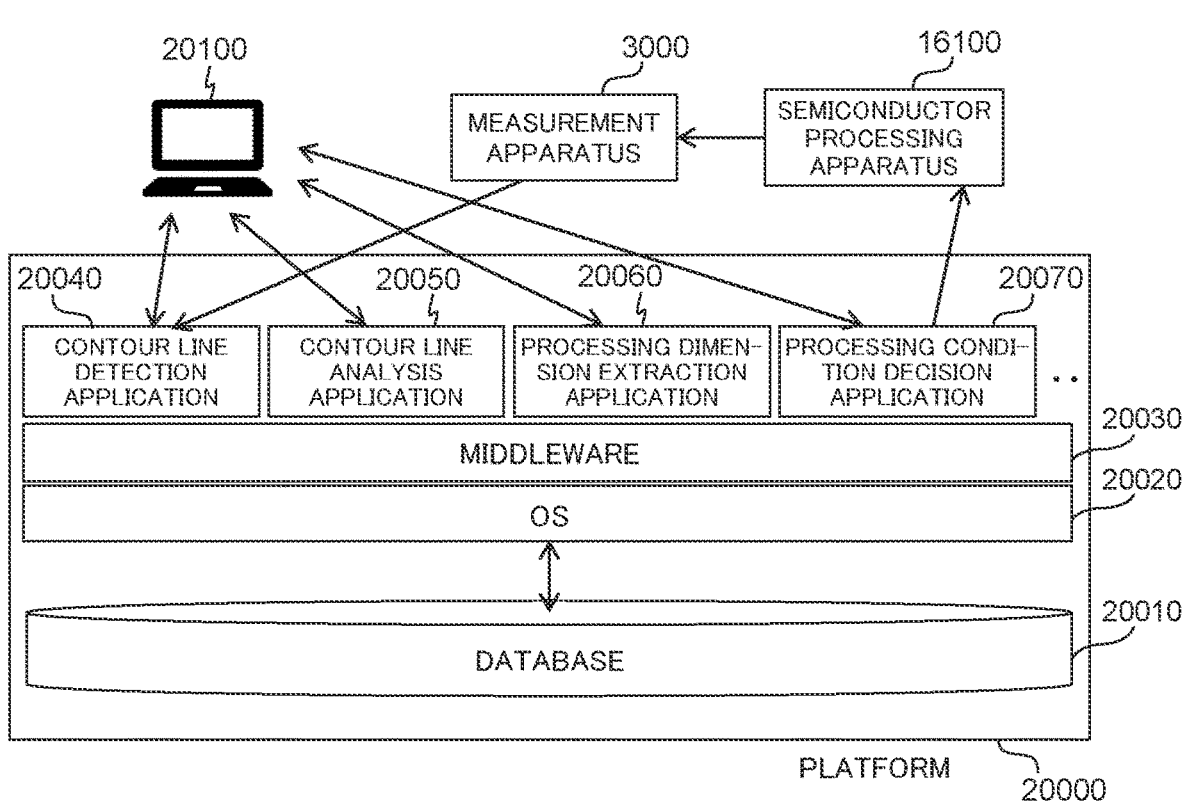
FIG. 20 is a configuration example of a semiconductor device manufacturing system.

A semiconductor device manufacturing system that implements the functions explained in Example 1 to Example 4 such as the functions of contour line detection and analysis, the function of processing dimension extraction, and the function of processing condition decision as applications on its platform will be described. The semiconductor device manufacturing system is shown in FIG. 20. A platform 20000 is structured on a cloud, and the applications that perform various pieces of processing are operative on an OS 20020 and a middleware 20030. The platform 20000 is provided with a contour line detection application 20040 that performs processing equivalent to the processing performed by the contour line detection apparatus 3100, a contour line analysis application 20050 that performs processing equivalent to the processing performed by the contour line analysis apparatus 3200, a processing dimension extraction application 20060 that performs processing equivalent to the processing performed by the processing dimension extraction apparatus 3300, and a processing condition decision application 20070 that performs processing equivalent to the processing performed by the processing condition decision apparatus 16000. A user can use the functions of the applications implemented on the platform 20000 by accessing the platform from a terminal 20100 via a network. The platform 20000 includes a database 20010, and data necessary for executing the applications are stored in the database 20010. In addition, the measurement apparatus 3000 and the semiconductor processing apparatus 16100 are also connected to the platform 20000 so that data can be exchanged via a network.

REFERENCE SIGNS LIST

1000 . . . start point, 1010 . . . end point, 1100 . . . shape model, 1200 . . . center point, 1210 . . . major axis length, 1220 . . . minor axis length, 1230 . . . gradient of major axis, 1240, 1250, 1260 . . . end point, 1270 . . . line segment, 2000 . . . mask, 2010 . . . film to be etched, 3000 . . . measurement apparatus, 3100 . . . contour line detection apparatus, 3200 . . . contour line analysis apparatus, 3210 . . . hyperparameter setting unit, 3220 . . . fitting method setting unit, 3230 . . . constraint condition setting unit, 3231 . . . function database, 3232 . . . constraint condition derivation unit, 3233 . . . processing dimension definition range input unit, 3240 . . . preprocessing unit, 3250 . . . fitting unit, 3260 . . . shape model database, 3300 . . . processing dimension extraction apparatus, 3310 . . . target processing dimension setting unit, 3320 . . . processing dimension calculation method setting unit, 3330 . . . processing dimension calculation unit, 4001 . . . shape model, 4002 . . . processing dimension tag, 4003 . . . processing dimension name, 4004 . . . processing dimension function, 5100, 5110 . . . extremum point, 5160, 5240, 5260 . . . end point, 5170 . . . point, 7000 . . . mask, 7100 . . . film to be etched, 8000 . . . contour line data, 8100, 8110 . . . shape model, 9211 . . . candidate model creation unit, 9212 . . . model evaluation unit, 9213 . . . model specification unit, 11000, 11100, 11200 . . . candidate model, 11300 . . . contour line data, 12011 . . . manual measurement unit, 12021 . . . function specification unit, 12022 . . . processing dimension tag selection unit, 14000 . . . contour line data, 14100 . . . space width, 16000 . . . processing condition decision apparatus, 16010 . . . processing condition database, 16020 . . . learning unit, 16030 . . . target parameter value setting unit, 16040 . . . processing condition estimation unit, 16100 . . . semiconductor processing apparatus, 18000 . . . GUI screen, 18100 . . . contour line detection setting box, 18110 . . . detection method input unit, 18200 . . . shape model hyperparameter setting box, 18210 . . . hyperparameter input box, 18300 . . . fitting method setting box, 18310 . . . fitting method input unit, 18400 . . . definition range setting box, 18410 . . . definition range input unit, 18500 . . . decision button, 19000 . . . GUI screen, 19100 . . . manual measurement box, 19110 . . . contour line datafile open button, 19120 . . . manual measurement screen, 19130 . . . manual measurement result display box, 19200 . . . processing dimension tag selection box, 19300 . . . decision button, 20000 . . . platform, 20010 . . . database, 20020 . . . OS, 20030 . . . middleware, 20040 . . . contour line detection application, 20050 . . . contour line analysis application, 20060 . . . processing dimension extraction application, 20070 . . . processing condition decision application, 20100 . . . terminal

The invention claimed is:

1. A contour line analysis apparatus for analyzing contour line data of a target structure detected from image data of a semiconductor sample obtained by a measurement apparatus using a charged particle beam device, the contour line analysis apparatus comprising:

a fitting unit that fits a shape model to the contour line data and obtains shape model parameters of the shape model;

a constraint condition setting unit that sets constraint conditions for the shape model parameters when the fitting unit fits the shape model to the contour line data; and a shape model database for storing likely shape model parameter values of the shape model obtained by the fitting unit's fitting the shape model to the contour line data under the constraint conditions set by the constraint condition setting unit, wherein the shape model is a curved line that is drawn with one stroke from its start point to its end point along a periphery of a figure that is a combination of one or more ellipses and one or more line segments in an xy-plane defined by an x axis and a y axis which are perpendicular to each other, and the constraint condition setting unit includes a function database that stores a processing dimension function that represents processing dimensions specified on the basis of singular points in the shape model and that has the shape model parameters as its variables, and a constraint condition derivation unit that derives the constraint conditions of the shape model parameters on the basis of definition ranges of the processing dimensions and the processing dimension function.

2. The contour line analysis apparatus according to claim 1, wherein the shape model parameters include: parameters related to shapes and dispositions of the one or more ellipses and one or more line segments that make up the figure; and parameters related to how to draw the curved line with one stroke.

3. The contour line analysis apparatus according to claim 2, wherein, if a depth direction of the target structure is set to be the x axis direction, coordinates of the singular points can be analytically derived from the shape model, and the singular points include indifferentiable points in differentiation of the shape model with respect to x, extremum points where differential coefficients of the shape model with respect to x are 0, and inflection points where second order differential coefficients of the shape model with respect to x change from positive to negative or vice versa.

4. The contour line analysis apparatus according to claim 1, wherein the shape model database stores the likely shape model parameter values and shape model hyperparameters of the shape model, and the shape model hyperparameters include the respective numbers of ellipses and line segments constituting the figure, and the order of dispositions from the start point to the end point of the figure.

5. The contour line analysis apparatus according to claim 4 comprising a hyperparameter setting unit for setting the shape model hyperparameters of the shape model, wherein the hyperparameter setting unit includes a candidate model creation unit for creating a plurality of the shape models each of which has the different shape model hyperparameters as candidate models, and a model evaluation unit for evaluating the plurality of candidate models using a result obtained by the fitting unit's fitting the plurality of candidate models to the contour line data, the shape model parameter values obtained by fitting the candidate model evaluated by the model evaluation unit as the best shape model to the contour line data are stored in the shape model database as the likely shape model parameter values, and the model parameter evaluation unit evaluates the candidate model on the basis of a fitting error of the candidate model and the number of the shape model parameters of the candidate model.

6. The contour line analysis apparatus according to claim 1, comprising a preprocessing unit for performing preprocessing on the contour line data before the fitting unit executes fitting the shape model on the contour line data.

7. The contour line analysis apparatus according to claim 1, wherein the function database stores one or more processing dimension functions associated with processing dimension tags that prescribe a type of the processing dimensions for each of the shape models.

8. A processing dimension extraction system that has the contour line analysis apparatus according to claim 1 and a processing dimension extraction apparatus and that extracts desired processing dimensions of the target structure, wherein the processing dimension extraction apparatus includes:

a processing dimension calculation method setting unit that selects a processing dimension function that describes the desired processing dimensions of the target structure among the processing dimension functions stored in the function database as a likely processing dimension function; and a processing dimension calculation unit that calculates the desired processing dimensions of the target structure by substituting the likely shape model parameter values stored in the shape model database into the likely processing dimension function.

9. The processing dimension extraction system according to claim 8, wherein the function database stores a plurality of the processing dimension functions that are candidates for describing the desired processing dimensions of the target structure, and the processing dimension calculation unit includes a function specification unit that, at the time of extracting the desired processing dimensions of the target structure from each of a plurality of the image data, measures the desired processing dimensions from the contour line data of the target structure detected from at least one of the plurality of image data pieces, calculates output errors between the measured values of the desired processing dimensions and the values calculated by substituting the likely shape model parameter values stored in the shape model database into a plurality of the processing dimension functions that become the candidates, and specifies a processing dimension function having the least output error of the output errors as the likely processing dimension function.

10. The processing dimension extraction system according to claim 9, wherein the function database stores one or more processing dimension functions associated with processing dimension tags that prescribe types of the processing dimensions for each of the shape models, and the processing dimension calculation unit defines the one or more processing dimension functions associated with the predefined processing dimension tags as the plurality of the processing dimension functions that become the candidates.

11. A processing condition decision system comprising the contour line analysis apparatus according to claim 1 and a processing condition decision apparatus that decides the processing conditions of a semiconductor processing apparatus, wherein the semiconductor sample is a semiconductor sample on which processing is performed by the semiconductor processing apparatus, the processing condition decision apparatus includes:

a learning unit learns that a correlation model between the processing conditions of the semiconductor processing apparatus and likely shape model parameter values of contour line data of a target structure detected from image data of the semiconductor sample on which processing is performed by the semiconductor processing apparatus under the processing conditions;

a target parameter value setting unit that sets target values of the shape model parameters; and a processing condition estimation unit that estimates the processing conditions of the semiconductor processing apparatus that gives the target values of the shape model parameters set by the target parameter value setting unit using the correlation model.

12. A semiconductor device manufacturing system comprising a platform that is connected to a terminal, a semiconductor processing apparatus, and a measurement apparatus for obtaining image data of a semiconductor sample on which processing is performed by the semiconductor processing apparatus via a network, and on which applications for searching for processing conditions of the semiconductor processing apparatus for forming a desired target structure in the semiconductor sample is implemented, wherein a contour line detection application and a contour line analysis application are implemented on the platform, the contour line detection application detects contour line data of the target structure from the image data, and the contour line analysis application executes:

a step of setting constraint conditions for fitting a shape model to the contour line data; and a step of storing shape model parameters of a shape model obtained by fitting the shape model to the contour line data under the constraint conditions in a shape model database as likely shape model parameters, the shape model is a curved line that is drawn with one stroke from its start point to its end point along a periphery of a figure that is a combination of one or more ellipses and one or more line segments in an xy-plane defined by an x axis and a y axis which are perpendicular to each other, and the constraint conditions are derived on the basis of a processing dimension function that is stored in a function database, represents processing dimensions specified on the basis of singular points in the shape model and that has the shape model parameters as its variables, and definition ranges of the processing dimensions.

13. The semiconductor device manufacturing system according to claim 12, wherein a processing dimension extraction application for extracting desired processing dimensions of the target structure is implemented on the platform;

the processing dimension extraction application executes:

a step of selecting a processing dimension function that describes the desired processing dimensions of the target structure as a likely processing dimension function out of the processing dimension functions stored in the function database; and a step of calculating the desired processing dimensions of the target structure by substituting the likely shape model parameters stored in the shape model database into the likely processing dimension function.

14. The semiconductor device manufacturing system according to claim 12, wherein a processing condition decision application for deciding the processing conditions of the semiconductor processing apparatus is implemented on the platform, the processing condition decision application executes:

a step of learning a correlation model between the processing conditions of the semiconductor processing apparatus and the likely shape model parameter values of the contour line data of a target structure detected from the image data of the semiconductor sample on which processing is performed by the semiconductor processing apparatus under the processing conditions;

a step of setting the target values of the shape model parameters; and a step of estimating the processing conditions of the semiconductor processing apparatus that gives the target values of the shape model parameters using the correlation model.

15. A non-transitory computer-readable medium upon which is embodied programmed instructions which, when executed by a processor, cause the processor to perform operations for analyzing a contour line of a target structure detected from image data of a semiconductor sample obtained by a measurement apparatus using a charged particle beam device, as a curved line that is drawn with one stroke from its start point to its end point along a periphery of a figure that is a combination of one or more ellipses and one or more line segments in an xy-plane defined by an x axis and a y axis which are perpendicular to each other, the operations comprising:

fitting a shape model to the contour line data;

obtaining shape model parameters of the shape model;

setting constraint conditions for the shape model parameters; and storing likely shape model parameter values of the shape model obtained by the fitting of the shape model to the contour line data under the constraint conditions set by the constraint condition setting unit, wherein the shape model is the curved line that is drawn with one stroke from its start point to its end point along a periphery of the figure that is the combination of the one or more ellipses and the one or more line segments in the xy-plane defined by the x axis and the y axis which are perpendicular to each other, wherein the storing likely shape model parameter values further comprises storing, using a function database, a processing dimension function that represents processing dimensions specified on the basis of singular points in the shape model and that has the shape model parameters as its variables, and storing the constraint conditions of the shape model parameters on the basis of definition ranges of the processing dimensions and the processing dimension function;

storing first parameters related to shapes and dispositions of one or more ellipses and one or more line segments that make up the figure; and storing second parameters related to how to draw the curved line with one stroke.

* * * * *